United States Patent
Hu et al.

(10) Patent No.: US 10,026,039 B2
(45) Date of Patent: Jul. 17, 2018

(54) METHOD AND APPARATUS FOR GENERATING DECISION TREE

(71) Applicant: Huawei Technologies Co., Ltd., Shenzhen (CN)

(72) Inventors: Jing Hu, Beijing (CN); Jun Gong, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 854 days.

(21) Appl. No.: 14/497,720

(22) Filed: Sep. 26, 2014

(65) Prior Publication Data

US 2015/0019471 A1  Jan. 15, 2015

Related U.S. Application Data

(63) Continuation of application No. PCT/CN2013/073036, filed on Mar. 22, 2013.

(30) Foreign Application Priority Data

Apr. 1, 2012  (CN) .......................... 2012 1 0095978

(51) Int. Cl.
*G06N 5/04* (2006.01)
*H04L 12/851* (2013.01)

(52) U.S. Cl.
CPC ........... *G06N 5/04* (2013.01); *H04L 47/2441* (2013.01)

(58) Field of Classification Search
CPC  G06N 5/025; G06N 5/02; G06N 5/04; G06N 5/027; G06F 17/30; H04L 47/2441

(Continued)

(56) References Cited

U.S. PATENT DOCUMENTS 7,937,336 B1   5/2011  Maynard-Zhang et al.
2007/0136223 A1*  6/2007  Bae .......................... G06N 5/04
                                                         706/45

(Continued)

FOREIGN PATENT DOCUMENTS

CN   102054002 A   5/2011
CN   102281196 A   12/2011

(Continued)

OTHER PUBLICATIONS

Mares, M., "The Saga of Minimum Spanning Trees," Research Paper, Computer Science Review 2, Dec. 2008, pp. 165-221.

(Continued)

*Primary Examiner* — Dave Misir
(74) *Attorney, Agent, or Firm* — Slater Matsil, LLP

(57) ABSTRACT

Embodiments of the present invention provide a method and an apparatus for generating a decision tree. The method includes generating an encoded rule set according to a rule set, generating a first weighted undirected graph, and calculating a weight of each side in the first weighted undirected graph. If a weight of a side with a maximum weight in the first weighted undirected graph is greater than a first threshold, a first operation is cyclically performed until a weight of a side with a maximum weight in a newly generated weighted undirected graph is less than or equal to the first threshold and a decision tree is generated for a rule subset corresponding to each vertex respectively in the newly generated weighted undirected graph.

19 Claims, 19 Drawing Sheets

(58) Field of Classification Search
USPC .......................................................... 706/47
See application file for complete search history.

(56) References Cited

U.S. PATENT DOCUMENTS

| | | | |
|---|---|---|---|
| 2007/0179966 A1* | 8/2007 | Li | ..................... G06F 17/30539 |
| 2011/0044341 A1* | 2/2011 | Sundstrom | .............. H04L 69/22 |
| | | | 370/392 |
| 2012/0233037 A1* | 9/2012 | Lamoureux | ............ G06Q 30/02 |
| | | | 705/27.2 |
| 2013/0166491 A1 | 6/2013 | Zhang et al. | |

FOREIGN PATENT DOCUMENTS

| | | |
|---|---|---|
| CN | 102664787 A | 9/2012 |
| WO | 2007113700 A2 | 10/2007 |
| WO | 2011085577 A1 | 7/2011 |

OTHER PUBLICATIONS

Venkata, K., et. al., "On Growing Better Decision Trees from Data," dissertation submitted to The Johns Hopkins University, XP-001159755, Oct. 1995, 297 pages.

\* cited by examiner

Rule set

| a10 | **** | 0110 |
|---|---|---|
| a20 | 111* | **** |
| a30 | 001* | 1001 |
| a40 | 00** | 00** |
| a50 | 0110 | **** |
| a60 | 1*** | 1*** |

Encoded rule set

| a1 | 0000 | 1111 |
|---|---|---|
| a2 | 1110 | 0000 |
| a3 | 1110 | 1111 |
| a4 | 1100 | 1100 |
| a5 | 1111 | 0000 |
| a6 | 1000 | 1000 |

Encoded rule set

| a1&a3 | 0000 | 1111 |
|---|---|---|
| a2 | 1110 | 0000 |
| a4 | 1100 | 1100 |
| a5 | 1111 | 0000 |
| a6 | 1000 | 1000 |

Encoded rule set

| a1&a3 | 0000 | 1111 |
|---|---|---|
| a2&a5 | 1110 | 0000 |
| a4 | 1100 | 1100 |
| a6 | 1000 | 1000 |

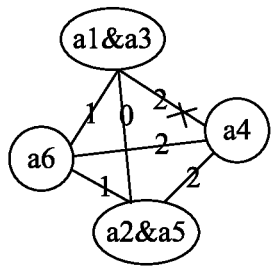
FIG 5b
Encoded rule set
| a1&a3&a4 | 0000 | 1100 |
| --- | --- | --- |
| a2&a5 | 1110 | 0000 |
| a6 | 1000 | 1000 |
FIG 6a
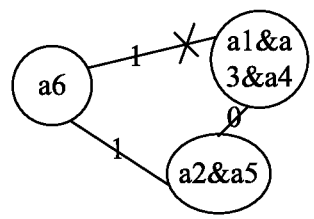
FIG 6b Encoded rule set

| a1&a3&a4&a6 | 0000 | 1000 |
|---|---|---|
| a2&a5 | 1110 | 0000 |

Multiple rule subsets obtained after cutting

| a10 | **** | 0110 |
|---|---|---|
| a30 | 001* | 1001 |
| a40 | 00** | 00** |
| a60 | 1*** | 1*** |
| a20 | 111* | **** |
| a50 | 0110 | **** |

| a20 | 111* | **** |
|---|---|---|
| a50 | 0110 | **** |

| | Rule set | |
|---|---|---|
| A0 | 110* | 111* |
| B0 | 011* | 011* |
| C0 | 001* | 000* |
| D0 | 00** | *1** |
| E0 | 1*** | 101* |
| F0 | **** | 001* |

| | Encoded rule set | |
|---|---|---|
| A | 1110 | 1110 |
| B | 1110 | 1110 |
| C | 1110 | 1110 |
| D | 1100 | 0100 |
| E | 1000 | 1110 |
| F | 0000 | 1110 |

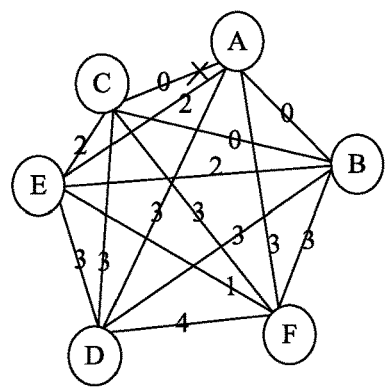
FIG 11c
Encoded rule set
| A&C | 1110 | 1110 |
|---|---|---|
| B | 1110 | 1110 |
| D | 1100 | 0100 |
| E | 1000 | 1110 |
| F | 0000 | 1110 |
FIG 12a
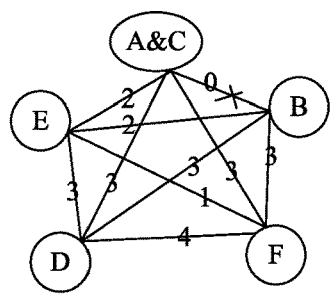
FIG 12b Encoded rule set

| A&C&B | 1110 | 1110 |
|---|---|---|
| D | 1100 | 0100 |
| E | 1000 | 1110 |
| F | 0000 | 1110 |

Encoded rule set

| A&C&B | 1110 | 1110 |
|---|---|---|
| D | 1100 | 0100 |
| E&F | 0000 | 1110 |

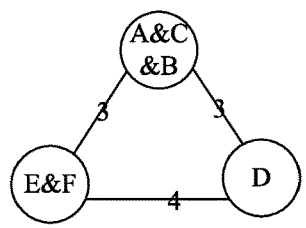
FIG 14b
Rule subsets obtained after cutting
| | | |
|---|---|---|
| A0 | 110* | 111* |
| B0 | 011* | 011* |
| C0 | 001* | 000* |
| D0 | 00** | *1** |
| E0 | 1*** | 101* |
| F0 | **** | 001* |
FIG 14c
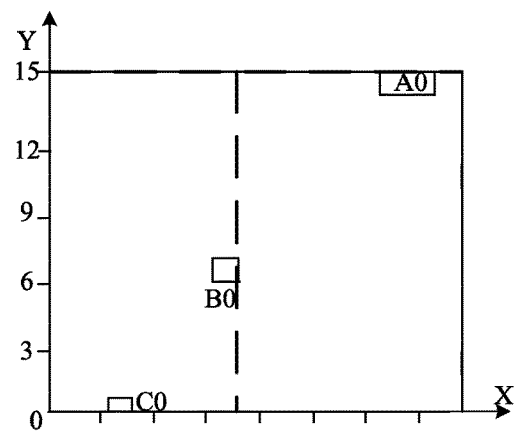
FIG 15a

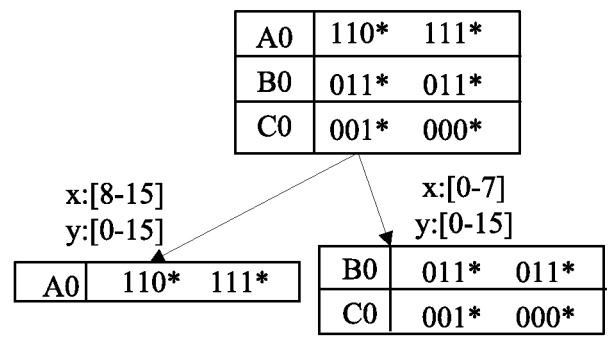
FIG 15b
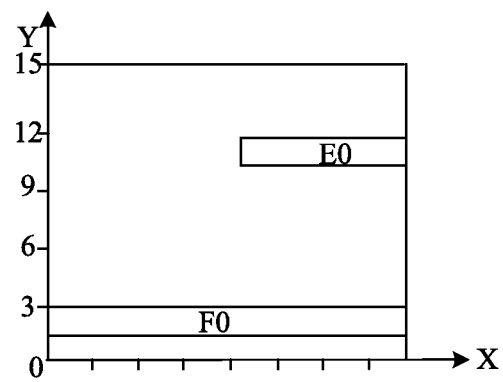
FIG 16a
| E0 | 1*** | 101* |
|---|---|---|
| F0 | **** | 001* |
FIG 16b

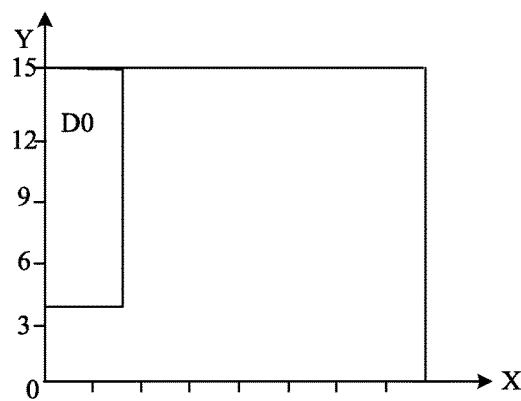
FIG 17a
FIG 17b
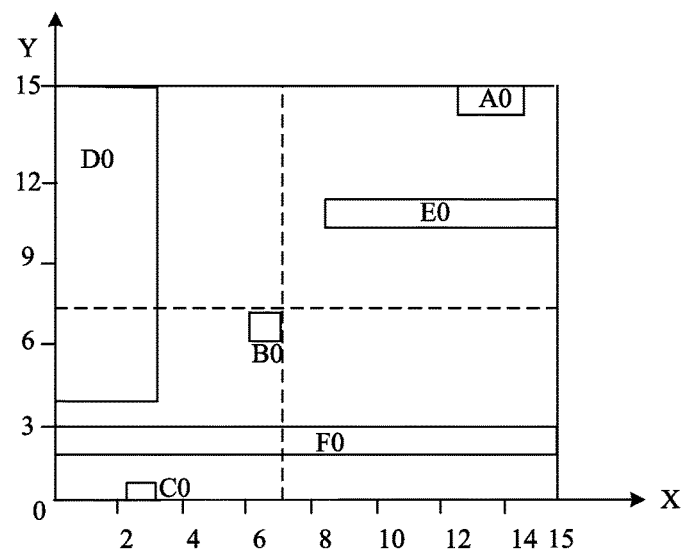
FIG. 18a

METHOD AND APPARATUS FOR GENERATING DECISION TREE

This application is a continuation of International Application No. PCT/CN2013/073036, filed on Mar. 22, 2013, which claims priority to Chinese Patent Application No. 201210095978.1, filed on Apr. 1, 2012, both of which are hereby incorporated by reference in their entireties.

TECHNICAL FIELD

Embodiments of the present invention relate to computer technologies, and in particular, to a method and an apparatus for generating a decision tree.

BACKGROUND

Traffic classification generally refers to defining some rules according to certain characteristics of packets, and using the rules to identify packets that meet certain characteristics, so as to classify packets. Multiple packets that match a specific rule constitute a stream. With a traffic classification mechanism, different streams can correspond to different quality of service (QoS for short). Compared with a traffic classification method based on dedicated hardware such as a ternary content addressable memory (TCAM for short), a decision-tree-based traffic classification method is vastly superior in terms of the speed of searching for matching rules, cost saving, and so on.

The principle of the decision-tree-based traffic classification method is to establish a decision tree by dividing a rule set into multiple rule subsets, and search in the rule subsets for a rule that matches a packet. A decision tree includes a root node, multiple intermediate nodes, and multiple leaf nodes. An operation of searching for a rule by using a decision tree may be: First, parse a packet header of a packet to obtain a keyword for searching; select a branch at an intermediate node of the decision tree according to one or more bits of the keyword to traverse the decision tree until a leaf node of the decision tree, where each leaf node includes a set of rules; match the packet with a rule subset included in the determined leaf node; and, if multiple rules that match the packet exist in this rule subset, then, among the multiple matching rules, select a rule of a highest priority as a rule for classifying the packet. For this packet, a traffic classifier performs actions corresponding to the rule of the highest priority. In practice, the decision-tree-based traffic classification method may be HiCuts, HyperCuts, or Modular.

The HiCuts method and the HyperCuts method deal with traffic classification issues from a geometric perspective. From a geometric perspective, if rules in a traffic classifier are formed by k domains that correspond respectively to a k-dimensional space, each rule corresponds to a "hyperrectangle (hyperrectangle)" region in the k-dimensional space, and each packet corresponds to a point in the k-dimensional space. The process of searching for a rule that matches a packet is equivalent to calculating the hyperrectangle into which the point corresponding to the packet falls. In the HiCuts method and the HyperCuts method, each domain in the rule is regarded as a range, and the domains of different ranges are put together and cut so that the rule set is divided into smaller rule subsets. The cutting stops when the number of rules in a rule subset is less than a preset threshold. Through cutting, a decision tree can be established. Intermediate nodes of the decision tree store information about the cutting method, for example, a dimension or dimensions selected for cutting, the number of cuts of each dimension, the rule subset stored by a leaf node, and so on.

In the Modular method, a rule set includes multiple rules of the same length. Each rule includes multiple bits. Each bit is "0", "1", or a wildcard. The wildcard may be expressed with "*". When a rule set is cut into multiple rule subsets, it is required to calculate the number of 0s, 1s, or wildcards in multiple bits corresponding to a position in the rule set, and select, according to a specific algorithm, a position for cutting the rule set. After a reference position for cutting the rule set is selected, all rules whose reference position is "0" among the multiple rules in the rule set are put into a rule subset, all rules whose reference position is "1" among the multiple rules in the rule set are put into another rule subset, and all rules whose reference position is a wildcard among the multiple rules in the rule set are put into those two rule subsets. The scenario of putting all rules whose reference position is a wildcard into two rule subsets is called rule replication in this application document. Through the foregoing operation, a rule set is divided into two rule subsets. The foregoing operation may be repeated for the generated rule subset until the number of rules in each rule subset is ultimately less than a preset threshold. In this way, a binary decision tree can be established. Each intermediate node of the decision tree stores an identifier of a reference bit for cutting the rules, and pointers of two child nodes of the intermediate node; and each leaf node stores a rule subset.

In the above decision-tree-based traffic classification method, the occurrence probability of rule replication is high in the process of generating the decision tree. Occurrence of rule replication means occupation of a larger storage space.

SUMMARY

Embodiments of the present invention provide a method and an apparatus for generating a decision tree to reduce the occurrence probability of rule replication.

In one aspect, an embodiment of the present invention provides a method for generating a decision tree, including:

generating an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment;

generating a first weighted undirected graph, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules;

calculating a weight of each side in the first weighted undirected graph, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function;

if a weight of a side with a maximum weight in the first weighted undirected graph is greater than a first threshold, where the first threshold is an integer greater than or equal to 0 but less than or equal to X−1, and X is the number of bits in the first encoded rule, performing the following operations cyclically until a weight of a side with a maximum weight in a newly generated weighted undirected graph is less than or equal to the first threshold:

generating a new vertex according to the side with the maximum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the maximum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the maximum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the maximum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function; and generating a decision tree for a rule subset corresponding to each vertex respectively in the newly generated weighted undirected graph.

In another aspect, an embodiment of the present invention provides a method for generating a decision tree, including:

generating an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment; and in a scenario where the first segment includes at least two characters, if the number of wildcards in the first segment is greater than or equal to N, the first code segment is 0, and, if the number of wildcards in the first segment is less than N, the first code segment is 1, where N is an integer greater than or equal to 1 but less than or equal to M, and M is the number of symbols in the first segment;

generating a first weighted undirected graph, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules;

calculating a weight of each side in the first weighted undirected graph, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function;

if a weight of a side with a minimum weight in the first weighted undirected graph is less than a first threshold, where the first threshold is an integer greater than or equal to 1 but less than or equal to X, and X is the number of bits in the first encoded rule, performing the following operations cyclically until a weight of a side with a minimum weight in a newly generated weighted undirected graph is greater than or equal to the first threshold:

generating a new vertex according to the side with the minimum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function; and generating a decision tree for a rule subset corresponding to each vertex respectively in the newly generated weighted undirected graph.

In another aspect, an embodiment of the present invention provides a method for generating a decision tree, including:

generating an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment;

generating a first weighted undirected graph, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules;

calculating a weight of each side in the first weighted undirected graph, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function;

if a weight of a side with a minimum weight in the first weighted undirected graph is less than a first threshold, where the first threshold is an integer greater than or equal to 1 but less than or equal to X, and X is the number of bits in the first encoded rule, performing the following operations cyclically until a weight of a side with a minimum weight in a newly generated weighted undirected graph is greater than or equal to the first threshold:

generating a new vertex according to the side with the minimum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function; and generating a decision tree for a rule subset corresponding to each vertex respectively in the newly generated weighted undirected graph.

In another aspect, an embodiment of the present invention provides an apparatus for generating a decision tree, including:

an encoding processing unit, configured to generate an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment;

a first weighted undirected graph generating unit, configured to generate a first weighted undirected graph according to the encoded rule set generated by the encoding processing unit, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules;

a side weight calculating unit, configured to calculate a weight of each side in the first weighted undirected graph according to the first weighted undirected graph generated by the first weighted undirected graph generating unit, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function;

a comparing unit, configured to: make comparison according to a calculation result of the side weight calculating unit; and if a weight of a side with a maximum weight in the first weighted undirected graph is greater than a first threshold, where the first threshold is an integer greater than or equal to 0 but less than or equal to X−1, and X is the number of bits in the first encoded rule, perform the following operations cyclically until a weight of a side with a maximum weight in a newly generated weighted undirected graph is less than or equal to the first threshold, and then send a trigger signal to a decision tree generating unit:

generating a new vertex according to the side with the maximum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the maximum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the maximum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the maximum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function; and the decision tree generating unit, configured to generate a decision tree for a rule subset corresponding to each vertex respectively in the newly generated weighted undirected graph according to the trigger signal sent by the comparing unit.

In another aspect, an embodiment of the present invention provides an apparatus for generating a decision tree, including:

an encoding processing unit, configured to generate an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment; and in a scenario where the first segment includes at least two characters, if the number of wildcards in the first segment is greater than or equal to N, the first code segment is 0, and, if the number of wildcards in the first segment is less than N, the first code segment is 1, where N is an integer greater than or equal to 1 but less than or equal to M, and M is the number of symbols in the first segment;

a first weighted undirected graph generating unit, configured to generate a first weighted undirected graph according to the encoded rule set generated by the encoding processing unit, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules;

a side weight calculating unit, configured to calculate a weight of each side in the first weighted undirected graph according to the first weighted undirected graph generated by the first weighted undirected graph generating unit, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function;

a comparing unit, configured to: make comparison according to a calculation result of the side weight calculating unit; and if a weight of a side with a minimum weight in the first weighted undirected graph is less than a first threshold, where the first threshold is an integer greater than or equal to 1 but less than or equal to X, and X is the number of bits in the first encoded rule, perform the following operations cyclically until a weight of a side with a minimum weight in a newly generated weighted undirected graph is greater than or equal to the first threshold, and then send a trigger signal to a decision tree generating unit:

generating a new vertex according to the side with the minimum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function; and the decision tree generating unit, configured to generate a decision tree for a rule subset corresponding to each vertex respectively in the newly generated weighted undirected graph according to the trigger signal sent by the comparing unit.

In another aspect, an embodiment of the present invention provides an apparatus for generating a decision tree, including:

an encoding processing unit, configured to generate an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment;

a first weighted undirected graph generating unit, configured to generate a first weighted undirected graph according to the encoded rule set generated by the encoding processing unit, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules;

a side weight calculating unit, configured to calculate a weight of each side in the first weighted undirected graph according to the first weighted undirected graph generated by the first weighted undirected graph generating unit, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function;

a comparing unit, configured to: make comparison according to a calculation result of the side weight calculating unit; and if a weight of a side with a minimum weight in the first weighted undirected graph is less than a first threshold, where the first threshold is an integer greater than or equal to 1 but less than or equal to X, and X is the number of bits in the first encoded rule, perform the following operations cyclically until a weight of a side with a minimum weight in a newly generated weighted undirected graph is greater than or equal to the first threshold, and then send a trigger signal to a decision tree generating unit:

generating a new vertex according to the side with the minimum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function; and the decision tree generating unit, configured to generate a decision tree for a rule subset corresponding to each vertex respectively in the newly generated weighted undirected graph according to the trigger signal sent by the comparing unit.

According to the technical solutions provided in the embodiments of the present invention, each rule in a rule set is encoded to obtain an encoded rule set; a weighted undirected graph is created based on the encoded rule set; two vertices corresponding to a side with a maximum (or minimum) weight in the weighted undirected graph are combined until a weight of a side with a maximum (or minimum) weight in a newly generated weighted undirected graph meets a certain condition; and each vertex in the newly generated weighted undirected graph corresponds to a rule subset respectively. In this way, a rule set is cut into multiple rule subsets. The probability of rule replication in multiple decision trees obtained by executing a decision tree generating algorithm, such as Modular or HyperCuts, respectively for the multiple rule subsets obtained by using the foregoing method, is lower than the probability of rule replication in a decision tree obtained by executing the same decision tree generating algorithm for a rule set. Therefore, the technical solutions provided in the embodiments of the present invention reduce the occurrence probability of rule replication.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 5b is a schematic diagram of a weighted undirected graph generated based on the weighted undirected graph shown in FIG. 4b according to an embodiment of the present invention;

FIG. 6a is a schematic diagram of an encoded rule set corresponding to a weighted undirected graph shown in FIG. 6b according to an embodiment of the present invention;

FIG. 6b is a schematic diagram of a weighted undirected graph generated based on the weighted undirected graph shown in FIG. 5b according to an embodiment of the present invention;

FIG. 11c shows a first weighted undirected graph generated based on the encoded rule set shown in FIG. 11b according to an embodiment of the present invention;

FIG. 12a shows an encoded rule set corresponding to a weighted undirected graph shown in FIG. 12b according to an embodiment of the present invention;

FIG. 12b shows a weighted undirected graph generated based on the first weighted undirected graph shown in FIG. 11c according to an embodiment of the present invention;

FIG. 14b shows a weighted undirected graph generated based on the weighted undirected graph shown in FIG. 13b according to an embodiment of the present invention;

FIG. 14c is a schematic diagram of a rule subset corresponding to the weighted undirected graph shown in FIG. 14b according to an embodiment of the present invention;

FIG. 15a is a schematic diagram of mapping a rule subset shown in FIG. 14c to a two-dimensional geometric space measured in metric units according to an embodiment of the present invention;

FIG. 15b is a schematic diagram of a decision tree generated based on a rule subset shown in FIG. 15a according to an embodiment of the present invention;

FIG. 16a is a schematic diagram of mapping another rule subset shown in FIG. 14c to a two-dimensional geometric space measured in metric units according to an embodiment of the present invention;

FIG. 16b is a schematic diagram of a decision tree generated based on a rule subset shown in FIG. 16a according to an embodiment of the present invention;

FIG. 17a is a schematic diagram of mapping still another rule subset shown in FIG. 14c to a two-dimensional geometric space measured in metric units according to an embodiment of the present invention;

FIG. 17b is a schematic diagram of a decision tree generated based on a rule subset shown in FIG. 17a according to an embodiment of the present invention;

FIG. 18a is a schematic diagram of mapping multiple rules in the rule set shown in FIG. 11b to a two-dimensional geometric space measured in metric units according to an embodiment of the present invention;

DETAILED DESCRIPTION OF ILLUSTRATIVE EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

The sequence numbers of the following embodiments of the present invention are for ease of description only, and do not represent superiority or inferiority of the embodiments.

An entity for executing the method provided in the embodiments of the present invention may be a traffic classifier or a device configured with a traffic classifier, such as a switch, a router, a base station, a load balancer, or a firewall. The traffic classifier may be a network processor (NP).

The apparatus provided in the embodiments of the present invention may be a traffic classifier or a device configured with a traffic classifier, such as a switch, a router, a base station, a load balancer, or a firewall. The traffic classifier may be a network processor.

Embodiment 1

Figure 1A:
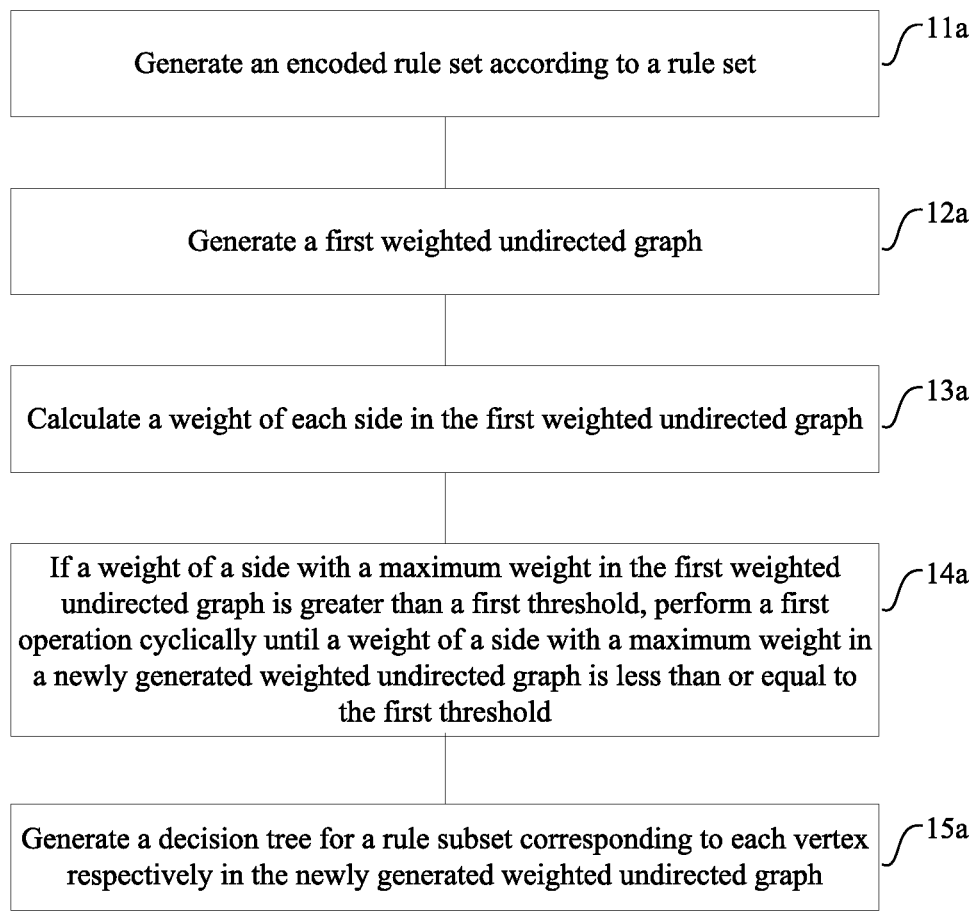
FIG. 1a is a flowchart of a method for generating a decision tree according to an embodiment of the present invention.

FIG. 1a is a flowchart of a method for generating a decision tree according to an embodiment of the present invention. As shown in FIG. 1a, the method includes the following steps.

11a. Generate an encoded rule set according to a rule set.
12a. Generate a first weighted undirected graph.
13a. Calculate a weight of each side in the first weighted undirected graph.
14a. If a weight of a side with a maximum weight in the first weighted undirected graph is greater than a first threshold, perform a first operation cyclically until a weight of a side with a maximum weight in a newly generated weighted undirected graph is less than or equal to the first threshold.
15a. Generate a decision tree for a rule subset corresponding to each vertex respectively in the newly generated weighted undirected graph.

In the above 11a, the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; and the first function is further used to calculate the first code segment according to the first segment.

In a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment; or, in a scenario where the first segment includes at least two characters, if the number of wildcards in the first segment is greater than or equal to N, the first code segment is 0, and, if the number of wildcards in the first segment is less than N, the first code segment is 0, where N is an integer greater than or equal to 1 but less than or equal to M, and M is the number of symbols in the first segment.

Optionally, in a scenario where the first segment includes one character, if the character in the first segment is 1, 0, or a wildcard, the first code segment is 1 or 0.

The above operation may be performed through the first function.

In the above 12a, the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules.

In the above 13a, a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function.

Optionally, the bitwise operation may be an AND operation, an OR operation, or an XOR operation.

In the above 14a, the first threshold is an integer greater than or equal to 0 but less than or equal to X−1, where X is the number of bits in the first encoded rule.

In the above 14a, the first operation includes: generating a new vertex according to the side with the maximum weight in the last generated weighted undirected graph among weighted undirected graphs that are generated, and generating a new weighted undirected graph according to the new vertex.

The new weighted undirected graph includes the new vertex and all vertices of the last generated weighted undirected graph except two vertices of the side with the maximum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the maximum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the maximum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; the fourth function is used to perform a bitwise operation for the sixth encoded rule and the seventh encoded rule and calculate the number of 1s in a result of the bitwise operation, where the number of 1s in the result of the bitwise operation is a value of the fourth function; and the bitwise operation is an AND operation, an OR operation, or an XOR operation, and the like.

In the above 14a, if the weighted undirected graphs that are generated include only the first weighted undirected graph, the first weighted undirected graph is the last generated weighted undirected graph among the weighted undirected graphs that are generated.

In the above 14a, there may be one or more sides with the maximum weight in the last generated weighted undirected graph among the weighted undirected graphs that are generated.

If there are multiple sides with the maximum weight in the last generated weighted undirected graph among the weighted undirected graphs that are generated, one of the sides may be selected randomly to generate the new vertex. If there are multiple sides with the maximum weight, the sum of rules included in the two rule subsets that correspond respectively to the two vertices of each of the sides may be calculated, and the new vertex is generated according to the side with the greatest sum of rules included in the two rule subsets that correspond respectively to the two vertices among the multiple sides with the maximum weight.

In addition, if there are multiple sides with the maximum weight in the last generated weighted undirected graph among the weighted undirected graphs that are generated, for (at least two) sides without a common vertex, (at least two) new vertices may be generated respectively, and a new weighted undirected graph may be generated according to the (at least two) new vertices. The common vertex refers to a vertex shared by two or more sides among the multiple sides with the maximum weight. It should be noted that, if there are multiple sides with the maximum weight in the last generated weighted undirected graph among the weighted undirected graphs that are generated, for two sides with a common vertex, new vertices cannot be generated respectively.

According to the technical solution provided in the embodiment of the present invention, each rule in a rule set is encoded to obtain an encoded rule set; a weighted undirected graph is created based on the encoded rule set; two vertices corresponding to a side with a maximum weight in the weighted undirected graph are combined until a weight of a side with a maximum weight in a newly generated weighted undirected graph meets a certain condition; and each vertex in the newly generated weighted undirected graph corresponds to a rule subset respectively. In this way, a rule set is cut into multiple rule subsets. The probability of rule replication in multiple decision trees obtained by executing a decision tree generating algorithm, such as Modular, respectively for the multiple rule subsets obtained by using the foregoing method, is lower than the probability of rule replication in a decision tree obtained by executing the same decision tree generating algorithm for a rule set. Therefore, the technical solution provided in the embodiment of the present invention reduces the occurrence probability of rule replication.

In addition, the probability of rule replication in multiple decision trees obtained by executing a decision tree generating algorithm respectively for the multiple rule subsets obtained by using the method provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained according to the method provided in this embodiment, the speed of rule matching performed for multiple decision trees concurrently is higher than or equal to the speed of rule matching performed for one decision tree separately.

Optionally, the bitwise operation is an AND operation, an OR operation, or an XOR operation.

Optionally, in a scenario where the first segment includes one character: if the character in the first segment is 1, the first code segment is 1; if the character in the first segment is 0, the first code segment is 1; and if the character in the first segment is a wildcard, the first code segment is 0.

The above operation may be performed through the first function.

Optionally, the generating a decision tree for a rule subset corresponding to each vertex respectively in the newly generated weighted undirected graph includes: generating a decision tree for a rule subset corresponding to each vertex respectively in the newly generated weighted undirected graph by using a Modular algorithm.

The technical solution of this embodiment is hereinafter specifically analyzed by using an example in which the bitwise operation is an AND operation and the first segment includes one character. That is, if the character in the first segment is 1, the first code segment is 1; if the character in the first segment is 0, the first code segment is 1; and if the character in the first segment is a wildcard, the first code segment is 0. In other words, the first segment may be 1, 0, or a wildcard. For ease of description, the first segment being 1 and the first segment being 0 are hereinafter uniformly called the first segment being a non-wildcard.

The first function is used to encode the first segment into a first code segment. Through encoding processing, for each rule in the rule set, the non-wildcard in the rule is encoded as 1, and the wildcard in the rule is encoded as 0. In a bit string obtained by performing a bitwise AND operation for two encoded rules, if a bit in a specific position in the bit string is 1, it indicates that two bits in a corresponding position in the two rules are both non-wildcards. By using this position as a reference position, rule replication is prevented. If a bit in a specific position in the bit string is 0, it indicates that at least one of the two bits in the corresponding position in the two rules is a wildcard. By using this position as a reference position, rule replication will inevitably occur.

The weight of a side in a weighted undirected graph is the number of 1s in a bit string obtained by performing a bitwise AND operation for two encoded rules. Therefore, a higher weight means that more positions in the two encoded rules can prevent rule replication and serve as reference positions. By using those positions as reference positions, rule replication can be prevented.

Figure 1B:
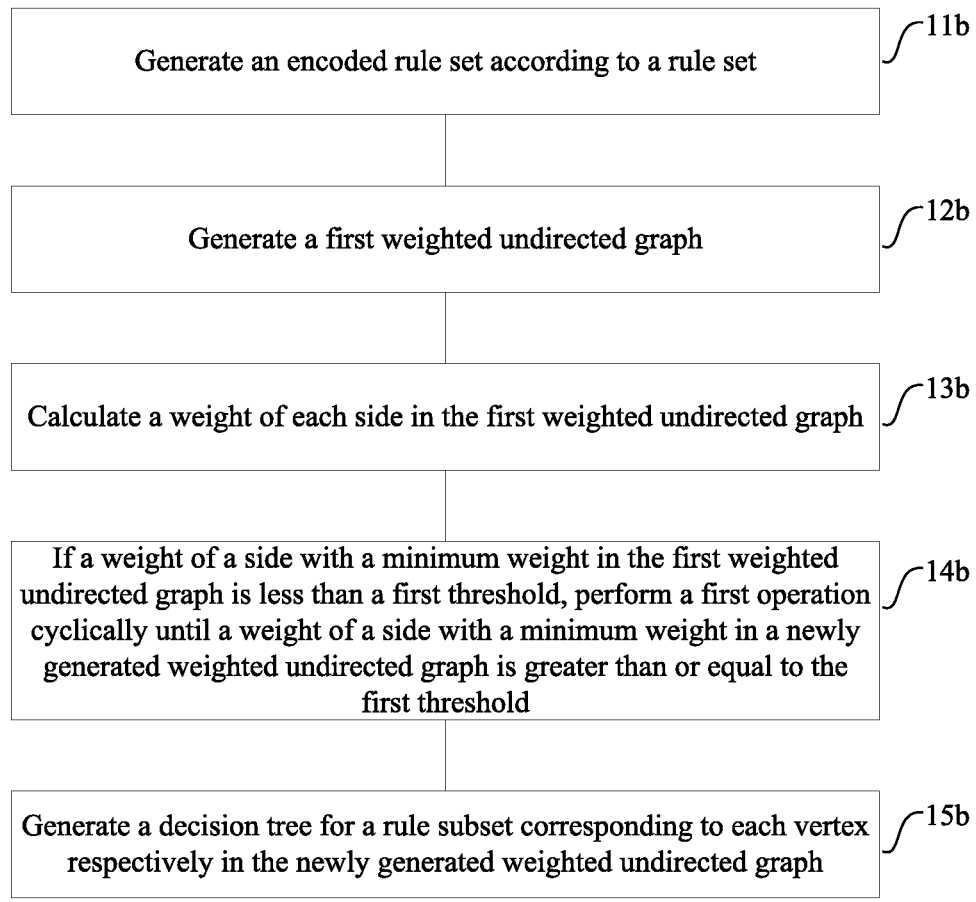
FIG. 1b is a flowchart of another method for generating a decision tree according to an embodiment of the present invention.

FIG. 1b is a flowchart of another method for generating a decision tree according to an embodiment of the present invention. The method shown in FIG. 1b includes the following:

11b. Generate an encoded rule set according to a rule set.

12b. Generate a first weighted undirected graph.

13b. Calculate a weight of each side in the first weighted undirected graph.

14b. If a weight of a side with a minimum weight in the first weighted undirected graph is less than a first threshold, perform a first operation cyclically until a weight of a side with a minimum weight in a newly generated weighted undirected graph is greater than or equal to the first threshold.

15b. Generate a decision tree for a rule subset corresponding to each vertex respectively in the newly generated weighted undirected graph.

In the above 11b, the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; and the first function is further used to calculate the first code segment according to the first segment.

In a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment; or, in a scenario where the first segment includes at least two characters, if the number of wildcards in the first segment is greater than or equal to N, the first code segment is 0, and, if the number of wildcards in the first segment is less than N, the first code segment is 1, where N is an integer greater than or equal to 1 but less than or equal to M, and M is the number of symbols in the first segment.

Optionally, in a scenario where the first segment includes one character, if the character in the first segment is 1, 0, or a wildcard, the first code segment is 1 or 0.

The above operation may be performed through the first function.

In the above 12b, the first weighted undirected graph includes multiple vertices, the multiple vertices are in one-to-one correspondence to the multiple encoded rules, and each of the multiple vertices corresponds to a rule subset, where: a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules.

In the above 13b, a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function.

Optionally, the bitwise operation may be an AND operation, an OR operation, or an XOR operation.

In the above 14b, the first threshold is an integer greater than or equal to 1 but less than or equal to X, where X is the number of bits in the first encoded rule.

In the above 14b, the first operation may include: generating a new vertex according to the side with the minimum weight in the last generated weighted undirected graph among weighted undirected graphs that are generated, and generating a new weighted undirected graph according to the new vertex.

The new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function.

In the above 14b, if the weighted undirected graphs that are generated include only the first weighted undirected graph, the first weighted undirected graph is the last generated weighted undirected graph among the weighted undirected graphs that are generated.

In the above 14b, there may be one or more sides with the minimum weight in the last generated weighted undirected graph among the weighted undirected graphs that are generated.

If there are multiple sides with the minimum weight in the last generated weighted undirected graph among the weighted undirected graphs that are generated, one of the sides may be selected randomly to generate the new vertex. If there are multiple sides with the minimum weight, the sum of rules included in the two rule subsets that correspond respectively to the two vertices of each of the sides may be calculated, and the new vertex is generated according to the side with the greatest sum of rules included in the two rule subsets that correspond respectively to the two vertices among the multiple sides with the minimum weight.

In addition, if there are multiple sides with the minimum weight in the last generated weighted undirected graph among the weighted undirected graphs that are generated, for (at least two) sides without a common vertex, (at least two) new vertices may be generated respectively, and a new weighted undirected graph may be generated according to the (at least two) new vertices. The common vertex refers to a vertex shared by two or more sides among the multiple sides with the minimum weight. It should be noted that, if there are multiple sides with the minimum weight in the last generated weighted undirected graph among the weighted undirected graphs that are generated, for two sides with a common vertex, new vertices cannot be generated respectively.

According to the technical solution provided in the embodiment of the present invention, each rule in a rule set is encoded to obtain an encoded rule set; a weighted undirected graph is created based on the encoded rule set; two vertices corresponding to a side with a minimum weight in the weighted undirected graph are combined until a weight of a side with a minimum weight in a newly generated weighted undirected graph meets a certain condition; and each vertex in the newly generated weighted undirected graph corresponds to a rule subset respectively. In this way, a rule set is cut into multiple rule subsets. The probability of rule replication in multiple decision trees obtained by executing a decision tree generating algorithm, such as Modular, respectively for the multiple rule subsets obtained by using the foregoing method, is lower than the probability of rule replication in a decision tree obtained by executing the same decision tree generating algorithm for a rule set. Therefore, the technical solution provided in the embodiment of the present invention reduces the occurrence probability of rule replication.

In addition, the probability of rule replication in multiple decision trees obtained by executing a decision tree generating algorithm respectively for the multiple rule subsets obtained by using the method provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained according to the method provided in this embodiment, the speed of rule matching performed for multiple decision trees concurrently is higher than or equal to the speed of rule matching performed for one decision tree separately.

Optionally, the bitwise operation is an AND operation, an OR operation, or an XOR operation.

Optionally, in a scenario where the first segment includes one character: if the character in the first segment is 1, the first code segment is 0; if the character in the first segment is 0, the first code segment is 0; and if the character in the first segment is a wildcard, the first code segment is 1.

The above operation may be performed through the first function.

Optionally, the generating a decision tree for a rule subset corresponding to each vertex respectively in the newly generated weighted undirected graph includes: generating a decision tree for a rule subset corresponding to each vertex respectively in the newly generated weighted undirected graph by using a Modular algorithm.

The technical solution of this embodiment is hereinafter specifically analyzed by using an example in which the bitwise operation is an OR operation and the first segment includes one character. That is, if the character in the first segment is 1, the first code segment is 0; if the character in the first segment is 0, the first code segment is 0; and if the character in the first segment is a wildcard, the first code segment is 1. In other words, the first segment may be 1, 0, or a wildcard. For ease of description, the first segment being 1 and the first segment being 0 are hereinafter uniformly called the first segment being a non-wildcard.

The first function is used to encode the first segment into a first code segment. Through encoding processing, for each rule in the rule set, the non-wildcard in the rule is encoded as 0, and the wildcard in the rule is encoded as 1.

In a bit string obtained by performing a bitwise OR operation for two encoded rules, if a bit in a specific position in the bit string is 1, it indicates that at least one of two bits in a corresponding position in the two rules is a wildcard. By using this position as a reference position, rule replication will occur. If a bit in a specific position in the bit string is 0, it indicates that the two bits in the corresponding position in the two rules are both non-wildcards. By using this position as a reference position, rule replication is prevented.

The weight of a side in a weighted undirected graph is the number of 1s in a bit string obtained by performing a bitwise OR operation for two encoded rules. Therefore, a lower weight means that more positions in the two encoded rules can prevent rule replication and serve as reference positions. By using those positions as reference positions, rule replication can be prevented.

Figure 2:
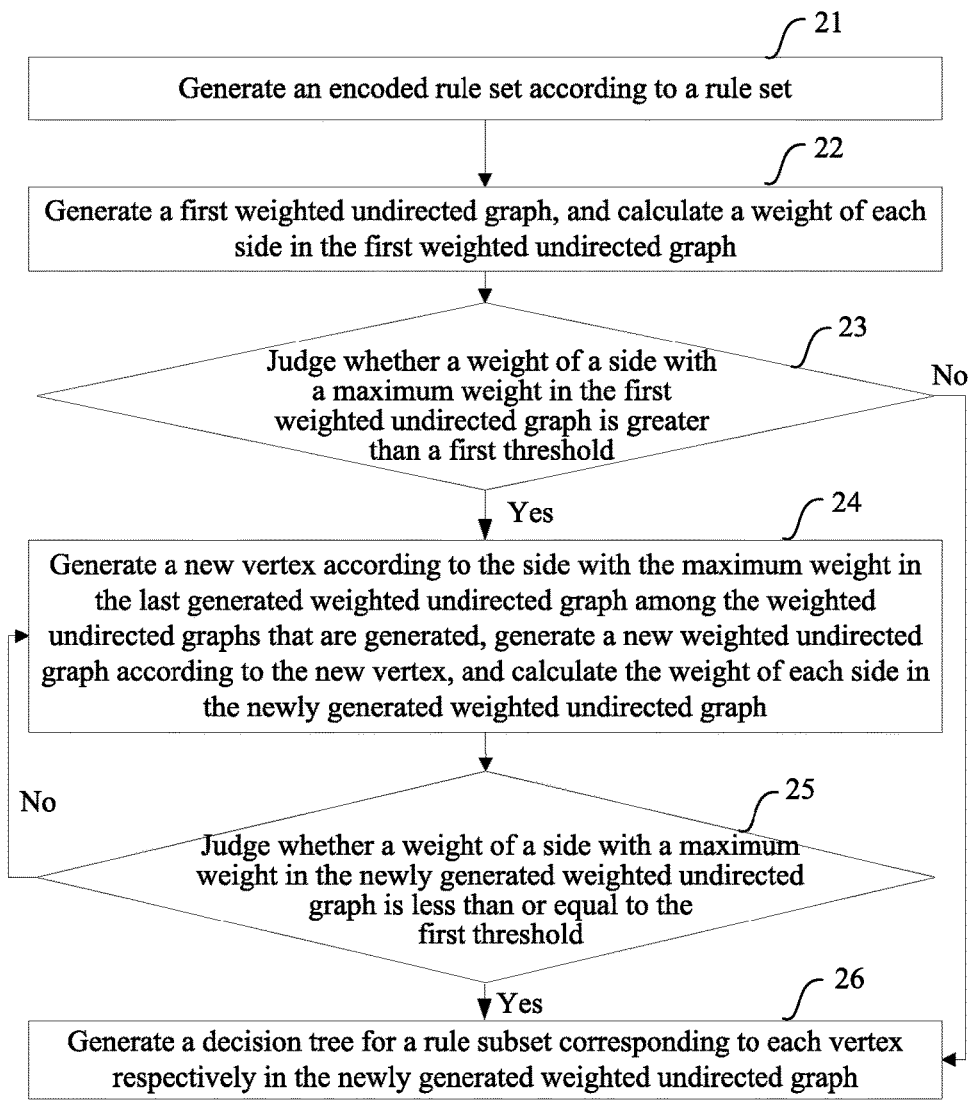
FIG. 2 is a flowchart of still another method for generating a decision tree according to an embodiment of the present invention.

The following describes the technical solution in the embodiment of the present invention by using an example with reference to FIG. 2.

In the following description, it is assumed that each rule in a rule set includes multiple segments, and that each segment includes 1 character. Referring to FIG. 2, the technical solution includes the following:

21. Generate an encoded rule set according to a rule set.

Figures 3A, 3B:
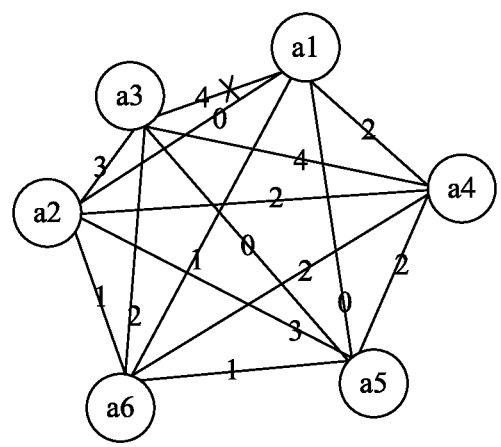
FIG. 3a is a schematic diagram of a rule set and a corresponding encoded rule set according to an embodiment of the present invention.
FIG. 3b is a schematic diagram of a first weighted undirected graph generated based on the encoded rule set shown in FIG. 3a according to an embodiment of the present invention.

FIG. 3a is a schematic diagram of a rule set and a corresponding encoded rule set, where rules a10, a20, a30, a40, a50, and a60 correspond to encoded rules a1, a2, a3, a4, a5, and a6, respectively.

The encoding manner used in FIG. 3a is: encoding "*" in the rule as 0, and encoding symbols other than "*" in the rule as 1, where "*" is a wildcard. In this embodiment, the meaning of "*" is: The value of a bit corresponding to "*" in the rule may be 0 or 1.

22. Generate a first weighted undirected graph, and calculate a weight of each side in the first weighted undirected graph.

FIG. 3b shows the first weighted undirected graph generated based on the encoded rule set shown in FIG. 3a, where the encoded rules a1, a2, a3, a4, a5, and a6 correspond to vertices a1, a2, a3, a4, a5, and a6 in the first weighted undirected graph, respectively. In this embodiment, the first weighted undirected graph is an initially generated weighted undirected graph. In the weighted undirected graph shown in FIG. 3b: each vertex corresponds to an encoded rule; and the weight of a side that connects two vertices of any side can be obtained by performing a bitwise AND operation for the encoded rules corresponding to the two vertices. A result of the bitwise AND operation is a bit string. The weight of the side is the number of 1s in the result of the bitwise AND operation. A bitwise AND operation is performed for the encoded rules corresponding respectively to the two vertices connected to the any side to obtain a first operation result; and the number of 1s in the first operation result is counted. For example, vertices a1 and a3 of the first weighted undirected graph correspond to the encoded rules a1 and a3 respectively. A bitwise AND operation is performed for the encoded rules a1 and a3 to obtain an operation result that includes four 1s. Therefore, the weight of the side that connects vertices a1 and a3 in the first weighted undirected graph is 4. As shown in FIG. 3b, a side with a maximum weight in the first weighted undirected graph is the side that connects vertices a1 and a3.

23. Judge whether a weight of a side with a maximum weight in the first weighted undirected graph is greater than a first threshold; and if yes, perform 24; otherwise, perform 26.

The first threshold is a decimal integer that ranges from 0 to 7.

As seen from FIG. 3a, through encoding processing, for each rule in the rule set, a non-wildcard in the rule is encoded as 1; and a wildcard in the rule is encoded as 0. In a bit string obtained by performing a bitwise AND operation for two encoded rules, if a bit in a specific position in the bit string is 1, it indicates that two bits in a corresponding position in the two rules are both non-wildcards. By using this position as a reference position, rule replication is prevented. If a bit in a specific position in the bit string is 0, it indicates that at least one of the two bits in the corresponding position in the two rules is a wildcard. By using this position as a reference position, rule replication will inevitably occur.

The weight of a side in a weighted undirected graph is the number of 1s in a bit string obtained by performing a bitwise AND operation for two encoded rules. Therefore, a higher weight means that more positions in the two encoded rules can prevent rule replication and serve as reference positions. By using those positions as reference positions, rule replication can be prevented. In the first weighted undirected graph shown in FIG. 3b, the weight of the side that connects vertices a1 and a3 is the greatest. Vertices a1 and a3 correspond to the encoded rules a1 and a3 respectively. Therefore, the encoded rules a1 and a3 include the greatest number of positions that can prevent rule replication and serve as reference positions, and the number is 4. By using any one of the 4 positions as a reference position, rule replication can be prevented.

In FIG. 3b, vertices a1 and a3 correspond to two rule subsets respectively, where the rule subset corresponding to the vertex a1 includes the rule a10, and the rule subset corresponding to the vertex a3 includes the rule a30. In the weighted undirected graph in FIG. 4b, the rule subset corresponding to the vertex a1&a3 includes the rules a10 and a30. For the 2 rules included in the rule subset corresponding to the vertex a1&a3, a total of 4 positions can serve as reference positions at which rule replication does not occur. Therefore, when a decision tree generating algorithm such as Modular is executed for the rule subset corresponding to the vertex a1&a3 to generate a decision tree, the occurrence probability of rule replication is relatively low.

It should be noted that in the first weighted undirected graph, the weight of the side that connects the vertices a3 and a4 is also 4. Therefore, the side that connects the vertices a3 and a4 is also the side with the maximum weight in the first weighted undirected graph. Either the side that connects the vertices a3 and a4 or the side that connects the vertices a3 and a1 may be selected randomly as the side eliminated. For example, in the embodiment of the present invention, the side that connects the vertices a3 and a1 is determined as a side for generating a new vertex.

24. Generate a new vertex according to the side with the maximum weight in the last generated weighted undirected graph among the weighted undirected graphs that are generated, generate a new weighted undirected graph according to the new vertex, and calculate the weight of each side in the newly generated weighted undirected graph.

An exemplary method for generating the new vertex is: determining a side with a maximum weight in the last generated weighted undirected graph among the weighted undirected graphs that are generated; performing a bitwise AND operation for the encoded rules corresponding respectively to two vertices of the side with the maximum weight to obtain a result of the bitwise AND operation; using the result of the bitwise AND operation as an encoded rule corresponding to the new vertex; and generating a new weighted undirected graph according to the new vertex and all vertices except the two vertices of the side with the maximum weight in the last generated weighted undirected graph among the weighted undirected graphs that are generated.

Figures 4A, 4B, 5A:
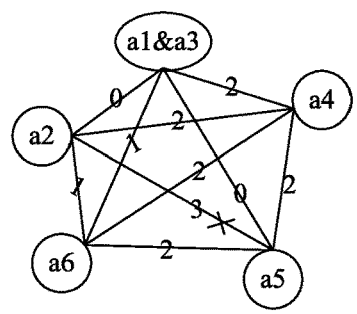
FIG. 4a is a schematic diagram of an encoded rule set corresponding to a weighted undirected graph shown in FIG. 4b according to an embodiment of the present invention.
FIG. 4b is a schematic diagram of a weighted undirected graph generated based on the first weighted undirected graph shown in FIG. 3b according to an embodiment of the present invention.
FIG. 5a is a schematic diagram of an encoded rule set corresponding to a weighted undirected graph shown in FIG. 5b according to an embodiment of the present invention.

For example, before the weighted undirected graph shown in FIG. 4b is generated, the weighted undirected graph shown in FIG. 3b is the last generated weighted undirected graph among the weighted undirected graphs that are generated. A bitwise AND operation is performed for the encoded rules corresponding respectively to the vertices a1 and a3 in the weighted undirected graph shown in FIG. 3b to obtain the encoded rule corresponding to the vertex a1&a3 in the weighted undirected graph shown in FIG. 4b, and further obtain an updated encoded rule set shown in FIG. 4a. Multiple encoded rules included in the encoded rule set shown in FIG. 4a are respectively in one-to-one correspondence to multiple vertices in the newly generated weighted undirected graph shown in FIG. 4b. In this case, the weighted undirected graph shown in FIG. 4b is the newly generated weighted undirected graph. The weight of each side in the weighted undirected graph shown in FIG. 4b is calculated. The calculation method is the same as what is described above, and is not repeated herein.

25. Judge whether a weight of a side with a maximum weight in the newly generated weighted undirected graph is less than or equal to the first threshold; and if yes, perform 26; otherwise, perform 24.

For example, the first threshold is preset to 1. Before the weighted undirected graph shown in FIG. 5b is generated, the weighted undirected graph shown in FIG. 4b is the last generated weighted undirected graph among the weighted undirected graphs that are generated. The side with the maximum weight in the weighted undirected graph shown in FIG. 4b is the side that connects the vertices a2 and a5. The weight of the side that connects the vertices a2 and a5 is 3. That is, the weight of the side with the maximum weight is greater than the first threshold. A bitwise AND operation is performed for the encoded rules corresponding respectively to the vertices a2 and a5, and a result of the bitwise AND operation is an encoded rule corresponding to a new vertex. The new vertex replaces the vertices a2 and a5 in the weighted undirected graph shown in FIG. 4b, and the weighted undirected graph shown in FIG. 5b is obtained. In this case, FIG. 5b is the newly generated weighted undirected graph. Multiple vertices included in the weighted undirected graph shown in FIG. 5b are in one-to-one correspondence to multiple encoded rules included in the encoded rule set shown in FIG. 5a. According to the encoded rules shown in FIG. 5a, the weight of each side in the weighted undirected graph shown in FIG. 5b is calculated.

In another example, before the weighted undirected graph shown in FIG. 6b is generated, FIG. 5b is the last generated weighted undirected graph among the weighted undirected graphs that are generated. The weight of the side with the maximum weight in the weighted undirected graph shown in FIG. 5b is 2. That is, the weight of the side with the maximum weight is greater than the first threshold. A bitwise AND operation is performed for the encoded rules corresponding respectively to the vertex a1 &a3 and the vertex a4, and a result of the bitwise AND operation is an encoded rule corresponding to a new vertex. The new vertex replaces the vertex a1 &a3 and the vertex a4 in FIG. 5b, and the weighted undirected graph shown in FIG. 6b is obtained. In this case, FIG. 6b is the newly generated weighted undirected graph. The 3 vertices included in the weighted undirected graph shown in FIG. 6b are in one-to-one correspondence to the 3 encoded rules included in the encoded rule set shown in FIG. 6a. According to the encoded rules shown in FIG. 6a, the weight of each side in the weighted undirected graph shown in FIG. 6b is calculated.

The weight of the side with the maximum weight in the weighted undirected graph shown in FIG. 6b is 1, that is, less than or equal to the first threshold. Therefore, the cutting of the rule set is complete. The rule subsets that correspond respectively to vertices in the weighted undirected graph shown in FIG. 6b are the multiple rule subsets obtained by cutting the rule set shown in FIG. 3a.

26. Generate a decision tree for a rule subset corresponding to each vertex respectively in the newly generated weighted undirected graph.

Figures 7A, 7B, 7C:
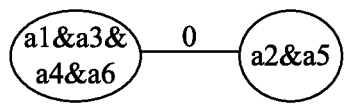
FIG. 7a is a schematic diagram of an encoded rule set corresponding to a weighted undirected graph shown in FIG. 7b according to an embodiment of the present invention.
FIG. 7b is a schematic diagram of a weighted undirected graph generated based on the weighted undirected graph shown in FIG. 6b according to an embodiment of the present invention.
FIG. 7c is a schematic diagram of a rule subset corresponding to the weighted undirected graph shown in FIG. 7b according to an embodiment of the present invention.

The weighted undirected graph shown in FIG. 7b has 2 vertices: vertex a1&a3&a4&a6 and vertex a2&a5. The vertex a1&a3&a4&a6 and the vertex a2&a5 correspond respectively to two rule subsets. That is, the rule set shown in FIG. 3a is cut into two rule subsets, specifically as shown in FIG. 7c. The rule subset corresponding to the vertex a1&a3&a4&a6 includes rules a10, a30, a40, and a60, that is, {a10, a30, a40, a60}; and the rule subset corresponding to the vertex a2&a5 includes rules a20 and a50, that is, {a20, a50}. According to Modular, a decision tree is generated respectively for the two rule subsets shown in FIG. 7c.

Figures 8A, 8B:
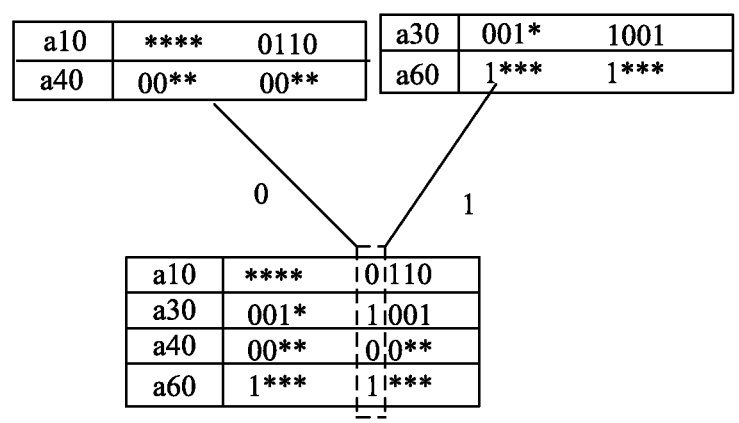
FIG. 8a is a schematic diagram of a decision tree generated based on a rule subset shown in FIG. 7c according to an embodiment of the present invention.
FIG. 8b is a schematic diagram of another decision tree generated based on another rule subset shown in FIG. 7c according to an embodiment of the present invention.
Figure 9:
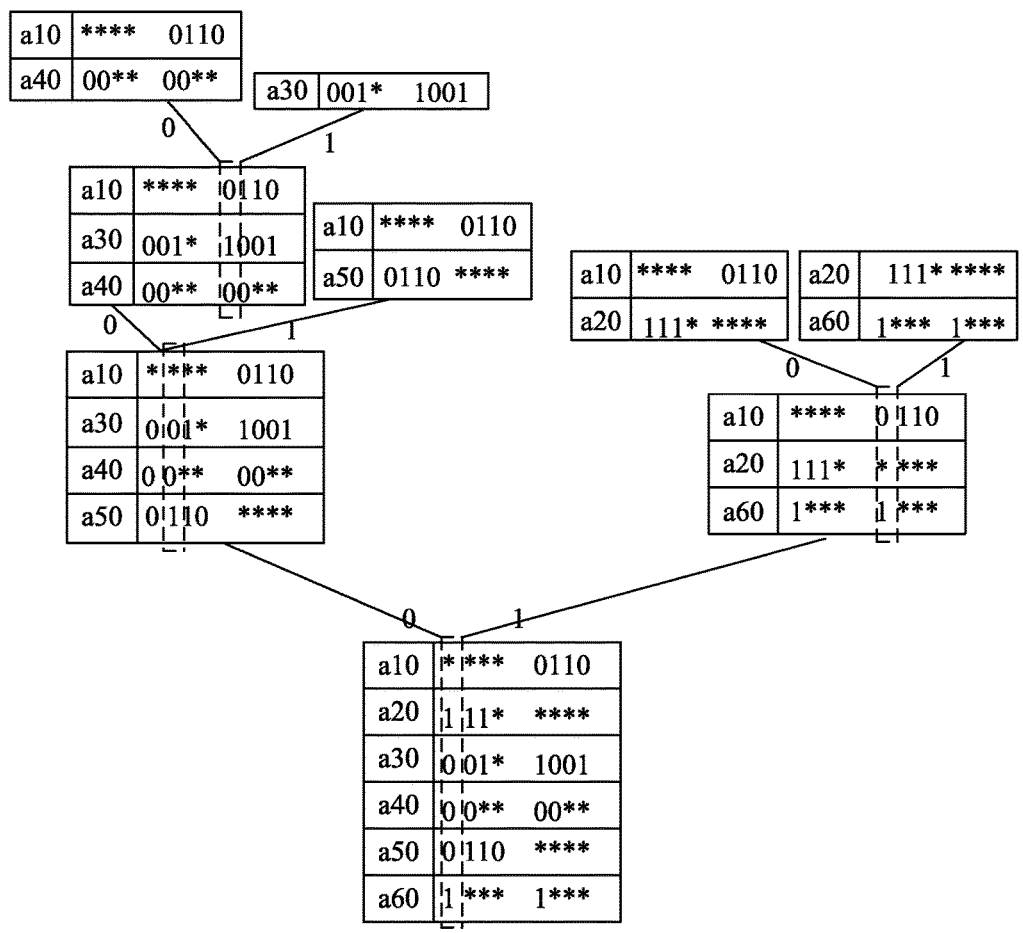
FIG. 9 is a schematic diagram of a decision tree generated based on the rule set shown in FIG. 3a according to an embodiment of the present invention.

If a preset traffic classifier supports concurrent rule matching for up to two decision trees, in this embodiment, the rule set shown in FIG. 3a is cut into two rule subsets, specifically as shown in FIG. 7c. By using a Modular algorithm, a decision tree is generated respectively for the two rule subsets shown in FIG. 7c. For details, refer to the decision tree shown in FIG. 8a and the decision tree shown in FIG. 8b. The decision tree shown in FIG. 9 is a decision tree generated for the rule set shown in FIG. 3a by using a Modular algorithm. The position marked by a dashed line in FIG. 9 is a reference position. As shown in FIG. 9, the rule whose reference position is 0 is placed on a next-level node on the left side; and the rule whose reference position is 1 is placed on a next-level node on the right side; and the rule whose reference position is * is placed on both the next-level nodes on the left side and the next-level node on the right side, and so on. The decision tree shown in FIG. 8a and the decision tree shown in FIG. 8b are compared with the decision tree shown in FIG. 9, and it is evident that the decision tree shown in FIG. 9 is taller and has a higher occurrence probability of rule replication. For example, rules a10, a20, a30, and a40 involve rule replication. The decision tree generated according to the method provided in the embodiment of the present invention is shorter, and has a lower occurrence probability of rule replication. In the decision trees shown in FIG. 8a and FIG. 8b, rule replication does not occur. Therefore, the decision tree generated according to the method provided in this embodiment has a lower probability of rule replication, and saves the storage space required for storing nodes of the decision tree.

According to the method provided in this embodiment, a rule set is cut into multiple rule subsets, and a decision tree generating algorithm is executed to generate a decision tree for each rule subset respectively. A rule set includes multiple rules. For example, a rule included in the rule set may be a destination Internet Protocol address. The destination Internet Protocol address may include 32 bits or 128 bits. After the decision tree is generated, a network device receives an Internet Protocol packet. The traffic classifier may parse the received Internet Protocol packet to obtain the destination Internet Protocol address of the Internet Protocol packet. The traffic classifier may execute rule matching in multiple decision trees concurrently according to the destination Internet Protocol address. If a rule that matches the destination Internet Protocol address of the Internet Protocol packet is found in multiple decision trees, an action corresponding to the rule is performed. The method for matching and searching in each decision tree is the same as that in the prior art, and is not detailed herein. In addition, if multiple rules match the Internet Protocol packet, the rule of the highest priority may be ultimately determined as a matching rule for the Internet Protocol packet according to the priority of each rule. An action corresponding to the ultimately matching rule, such as passing, discarding, traffic limiting, and bandwidth guarantee, is performed for the Internet Protocol packet.

When a new rule is added to the rule set, the method provided in this embodiment can perform cutting processing for the new rule only. For example, the new rule is encoded by using the same encoding method to obtain a new encoded rule corresponding to the new rule, and a weighted undirected graph is generated based on the new encoded rule and the encoded rule set corresponding to the original rule set.

Based on the weighted undirected graph, it is determined whether the new rule belongs to a rule subset in multiple rule subsets corresponding to the original rule set, or belongs to a new rule subset. For the former, the rule subset that includes the new rule may be updated, and a decision tree is generated again; for the latter, a decision tree may be generated based on the new rule subset. Therefore, in the method provided in this embodiment, when a new rule is added to a rule set, it is not required to generate a decision tree again for all rule subsets obtained by cutting the original rule set, but required to generate a decision tree again for only the rule subset that includes the new rule or for only the new rule subset corresponding to the new rule.

Embodiment 2

Figure 10:
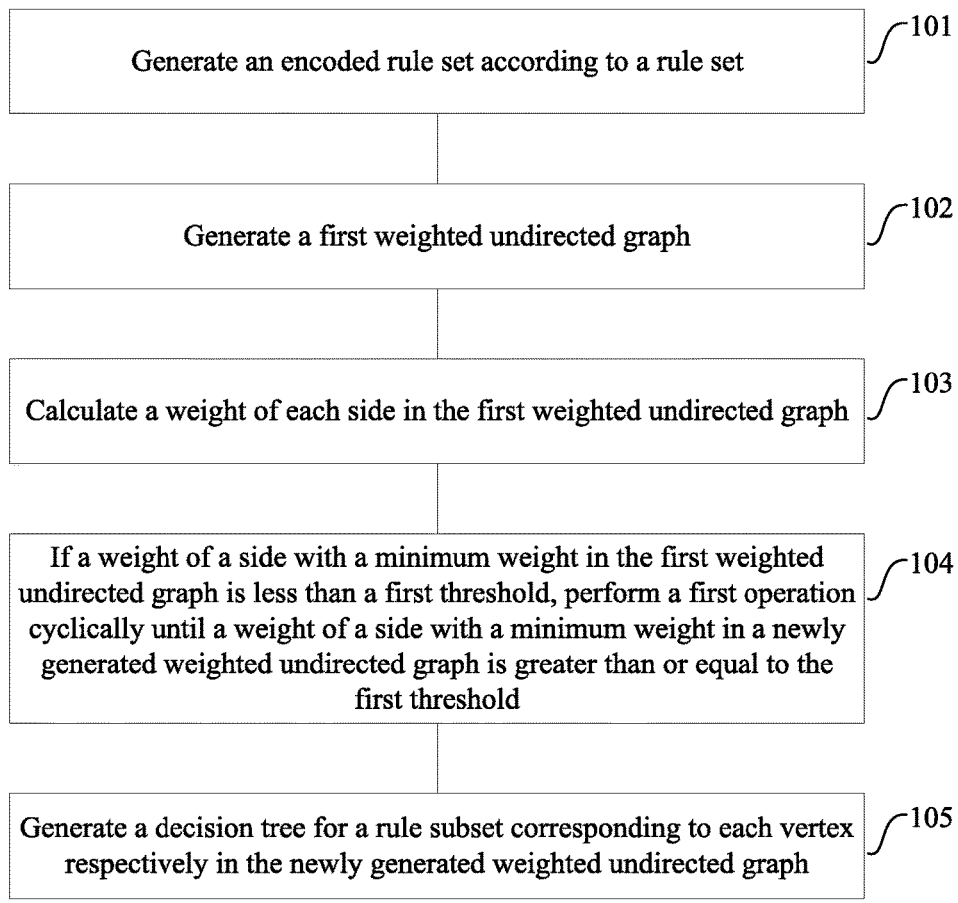
FIG. 10 is a flowchart of yet another method for generating a decision tree according to an embodiment of the present invention.

FIG. 10 is a flowchart of a method for generating a decision tree according to an embodiment of the present invention. As shown in FIG. 10, the method includes the following steps.

101. Generate an encoded rule set according to a rule set.
102. Generate a first weighted undirected graph.
103. Calculate a weight of each side in the first weighted undirected graph.
104. If a weight of a side with a minimum weight in the first weighted undirected graph is less than a first threshold, where the first threshold is an integer greater than or equal to 1 but less than or equal to X, and X is the number of bits in the first encoded rule, perform a first operation cyclically until a weight of a side with a minimum weight in a newly generated weighted undirected graph is greater than or equal to the first threshold.
105. Generate a decision tree for a rule subset corresponding to each vertex respectively in the newly generated weighted undirected graph.

In the above 101, the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; and the first function is further used to calculate the first code segment according to the first segment.

In a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment; or, in a scenario where the first segment includes at least two characters, if the number of wildcards in the first segment is greater than or equal to N, the first code segment is 0, and, if the number of wildcards in the first segment is less than N, the first code segment is 1, where N is an integer greater than or equal to 1 but less than or equal to M, and M is the number of symbols in the first segment.

In a scenario where the first segment includes one character, if the character in the first segment is 1, 0, or a wildcard, the first code segment is 1 or 0.

The above operation may be performed through the first function.

In the above 102, the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules.

In the above 103, a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function.

Optionally, the bitwise operation may be an AND operation, an OR operation, or an XOR operation.

In the above 104, the first operation includes: generating a new vertex according to the side with the minimum weight in the last generated weighted undirected graph among weighted undirected graphs that are generated, and generating a new weighted undirected graph according to the new vertex.

The new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; the fourth function is used to perform a bitwise operation for the sixth encoded rule and the seventh encoded rule and calculate the number of 1s in a result of the bitwise operation, where the number of 1s in the result of the bitwise operation is a value of the fourth function; and the bitwise operation is an AND operation, an OR operation, or an XOR operation, and the like.

In the above 104, if the weighted undirected graphs that are generated include only the first weighted undirected graph, the first weighted undirected graph is the last generated weighted undirected graph among the weighted undirected graphs that are generated.

In the above 104, there may be one or more sides with the minimum weight in the last generated weighted undirected graph among the weighted undirected graphs that are generated.

If there are multiple sides with the minimum weight in the last generated weighted undirected graph among the weighted undirected graphs that are generated, one of the sides may be selected randomly to generate the new vertex. If there are multiple sides with the minimum weight, the sum of rules included in the two rule subsets that correspond respectively to the two vertices of each of the sides may be calculated, and the new vertex is generated according to the side with the greatest sum of rules included in the two rule subsets that correspond respectively to the two vertices among the multiple sides with the minimum weight.

In addition, if there are multiple sides with the minimum weight in the last generated weighted undirected graph among the weighted undirected graphs that are generated, for (at least two) sides without a common vertex, (at least two) new vertices may be generated respectively, and a new weighted undirected graph may be generated according to the (at least two) new vertices. The common vertex refers to a vertex shared by two or more sides among the multiple sides with the minimum weight. It should be noted that, if there are multiple sides with the minimum weight in the last generated weighted undirected graph among the weighted undirected graphs that are generated, for two sides with a common vertex, new vertices cannot be generated respectively.

According to the technical solution provided in the embodiment of the present invention, each rule in a rule set is encoded to obtain an encoded rule set; a weighted undirected graph is created based on the encoded rule set; two vertices corresponding to a side with a minimum weight in the weighted undirected graph are combined until a weight of a side with a minimum weight in a newly generated weighted undirected graph meets a certain condition; and each vertex in the newly generated weighted undirected graph corresponds to a rule subset respectively. In this way, a rule set is cut into multiple rule subsets. The probability of rule replication in multiple decision trees obtained by executing a decision tree generating algorithm, such as HyperCuts, respectively for the multiple rule subsets obtained by using the foregoing method, is lower than the probability of rule replication in a decision tree obtained by executing the same decision tree generating algorithm for a rule set. Therefore, the technical solution provided in the embodiment of the present invention reduces the occurrence probability of rule replication.

In addition, the probability of rule replication in multiple decision trees obtained by executing a decision tree generating algorithm respectively for the multiple rule subsets obtained by using the method provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained according to the method provided in this embodiment, the speed of rule matching performed for multiple decision trees concurrently is higher than or equal to the speed of rule matching performed for one decision tree separately.

Optionally, the bitwise operation is an AND operation, an OR operation, or an XOR operation.

Optionally, in a scenario where the first segment includes one character: if the character in the first segment is 1, the first code segment is 1; if the character in the first segment is 0, the first code segment is 1; and if the character in the first segment is a wildcard, the first code segment is 0.

The above operation may be performed through the first function.

Optionally, if the character in the first segment is 1, the first code segment is 0; if the character in the first segment is 0, the first code segment is 0; and if the character in the first segment is a wildcard, the first code segment is 1.

The above operation may be performed through the first function.

Optionally, the generating a decision tree for a rule subset corresponding to each vertex respectively in the newly generated weighted undirected graph includes: generating a decision tree for a rule subset corresponding to each vertex respectively in the newly generated weighted undirected graph by using a HyperCuts algorithm.

The technical solution of this embodiment is hereinafter specifically analyzed by using an example in which the bitwise operation is an XOR operation, the first segment includes one character, non-wildcards in the rule are encoded as 1s, and wildcards in the rule are encoded as 0s. That is, if the character in the first segment is 1, the first code segment is 1; if the character in the first segment is 0, the first code segment is 1; and if the character in the first segment is a wildcard, the first code segment is 0. In other words, the first segment may be 1, 0, or a wildcard. For ease of description, the first segment being 1 and the first segment being 0 are hereinafter uniformly called the first segment being a non-wildcard.

According to the technical solution provided in the embodiment of the present invention, a HyperCuts algorithm is executed to generate a decision tree for multiple rule subsets obtained through rule cutting. Rule cutting involves rules, encoded rules, and bitwise XOR operations. The following describes the relationship between the rule, the encoded rule, and the bitwise XOR operation that are involved in rule cutting:

Two rules are encoded respectively to obtain two encoded rules. In the two rules, if two bits in the same position are both non-wildcards, both are encoded as 1s. That is, after the two rules are encoded, two bits in the corresponding position in the two obtained encoded rules are both 1s. Therefore, a result of a bitwise XOR operation for the two bits in the corresponding position in the two encoded rules is 0.

Two rules are encoded respectively to obtain two encoded rules. In the two rules, if one of two bits in the same position is a non-wildcard, and the other is a wildcard, the two bits are encoded as 1 and 0 respectively. That is, after the two rules are encoded, two bits in the corresponding position in the two obtained encoded rules are 1 and 0 respectively. Therefore, a result of a bitwise XOR operation for the two bits in the corresponding position in the two encoded rules is 1.

Two rules are encoded respectively to obtain two encoded rules. In the two rules, if two bits in the same position are both wildcards, both are encoded as 0s. That is, after the two rules are encoded, two bits in the corresponding position in the two obtained encoded rules are both 0s. Therefore, a result of a bitwise XOR operation for the two bits in the corresponding position in the two encoded rules is 0.

As seen from the above analysis, a result of an XOR operation for two encoded rules is the number of occurrences of a first situation in the two rules, where the first situation is: In two bits in the same position in two encoded rules, one bit is a wildcard, and the other is a non-wildcard. If the bit position in which the first situation occurs is selected as a reference position, rule replication will occur. The weight of a side in a weighted undirected graph is the number of is in a bit string obtained by performing a bitwise XOR operation for two encoded rules. That is, the weight reflects the number of occurrences of the first situation. Obviously, if the number of occurrences of the first situation is smaller, there will be more positions that can prevent rule replication and serve as reference positions. By selecting those reference positions for cutting rules, rule replication can be prevented.

The technical solution of this embodiment is hereinafter specifically analyzed by using an example in which the bitwise operation is an XOR operation, the first segment includes one character, non-wildcards in the rule are encoded as 0s, and wildcards in the rule are encoded as 1s. That is, if the character in the first segment is 1, the first code segment is 0; if the character in the first segment is 0, the first code segment is 0; and if the character in the first segment is a wildcard, the first code segment is 1. In other words, the first segment may be 1, 0, or a wildcard. For ease of description, the first segment being 1 and the first segment being 0 are hereinafter uniformly called the first segment being a non-wildcard.

According to the technical solution provided in the embodiment of the present invention, a HyperCuts algorithm is executed to generate a decision tree for multiple rule subsets obtained through rule cutting. Rule cutting involves rules, encoded rules, and bitwise XOR operations. The following describes the relationship between the rule, the encoded rule, and the bitwise XOR operation that are involved in rule cutting:

Two rules are encoded respectively to obtain two encoded rules. In the two rules, if two bits in the same position are both non-wildcards, both are encoded as 0s. That is, after the two rules are encoded, two bits in the corresponding position in the two obtained encoded rules are both 0s. Therefore, a result of a bitwise XOR operation for the two bits in the corresponding position in the two encoded rules is 0.

Two rules are encoded respectively to obtain two encoded rules. In the two rules, if one of two bits in the same position is a non-wildcard, and the other is a wildcard, the two bits are encoded as 0 and 1 respectively. That is, after the two rules are encoded, two bits in the corresponding position in the two obtained encoded rules are 0 and 1 respectively. Therefore, a result of a bitwise XOR operation for the two bits in the corresponding position in the two encoded rules is 1.

Two rules are encoded respectively to obtain two encoded rules. In the two rules, if two bits in the same position are both wildcards, both are encoded as 1s. That is, after the two rules are encoded, two bits in the corresponding position in the two obtained encoded rules are both 1s. Therefore, a result of a bitwise XOR operation for the two bits in the corresponding position in the two encoded rules is 0.

As seen from the above analysis, a result of an XOR operation for two encoded rules is the number of occurrences of a second situation in the two rules, where the second situation is: In two bits in the same position in two encoded rules, one bit is a wildcard, and the other is a non-wildcard. If the bit position in which the second situation occurs is selected as a reference position, rule replication will occur. The weight of a side in a weighted undirected graph is the number of 1s in a bit string obtained by performing a bitwise XOR operation for two encoded rules. That is, the weight reflects the number of occurrences of the second situation. Obviously, if the number of occurrences of the second situation is smaller, there will be more positions that can prevent rule replication and serve as reference positions. By selecting those reference positions for cutting rules, rule replication can be prevented.

In addition, the probability of rule replication in multiple decision trees obtained by executing a decision tree generating algorithm respectively for the multiple rule subsets obtained by using the method provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained according to the method provided in this embodiment, the speed of rule matching performed for multiple decision trees concurrently is higher than or equal to the speed of rule matching performed for one decision tree separately.

The following describes the technical solution in the embodiment of the present invention by using an example with reference to an accompanying drawing.

Figures 11A, 11B:
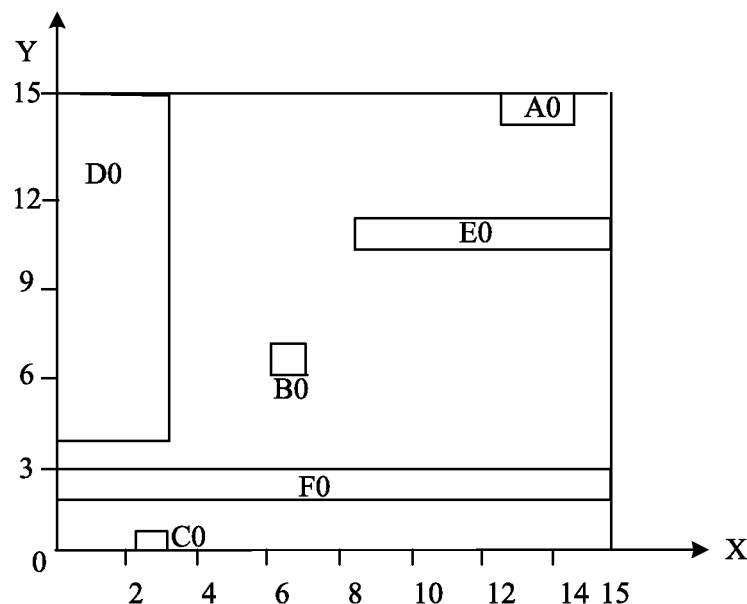
FIG. 11a is a schematic diagram of mapping multiple rules in a rule set shown in FIG. 11b to a two-dimensional geometric space measured in metric units according to an embodiment of the present invention.
FIG. 11b is a schematic diagram of another rule set and a corresponding encoded rule set according to an embodiment of the present invention.

HyperCuts is an algorithm for generating a decision tree. In HyperCuts, a decision tree is created by putting different segments of a rule into different dimensions of a geometric space. FIG. 11a is a schematic diagram of mapping 6 rules in a rule set shown in FIG. 11b to a two-dimensional geometric space measured in metric units. Specifically, the rule set shown in FIG. 11b includes 6 rules, and the higher 4 bits and the lower 4 bits of each rule are respectively mapped to an X axis and a Y axis of a two-dimensional geometric space shown in FIG. 1l a.

FIG. 11b is a schematic diagram of a rule set and a corresponding encoded rule set, where the rule set includes rules A0, B0, C0, D0, E0, and F0. The length of each rule is 8 bits. The rules A0, B0, C0, D0, E0, and F0 in the rule set correspond to A, B, C, D, E, and F in the encoded rule set respectively. The specific encoding manner is: encoding a non-wildcard as 1, and encoding a wildcard as 0.

A first weighted undirected graph is generated. In this case, the first weighted undirected graph is the last generated weighted undirected graph among the weighted undirected graphs that are generated. FIG. 11c shows a first weighted undirected graph according to an embodiment of the present invention. In the first weighted undirected graph shown in FIG. 11c, vertices are A, B, C, D, E, and F respectively. The vertices A, B, C, D, E, and F correspond to a rule subset respectively. The rule subset corresponding to the vertex A includes the rule A0; the rule subset corresponding to the vertex B includes the rule B0; the rule subset corresponding to the vertex C includes the rule C0; the rule subset corresponding to the vertex D includes the rule D0; the rule subset corresponding to the vertex E includes the rule E0; and the rule subset corresponding to the vertex F includes the rule F0.

Referring to FIG. 11c, the first weighted undirected graph includes 6 vertices, that is, A, B, C, D, E, and F. The vertices A, B, C, D, E, and F in FIG. 11c correspond to encoded rules A, B, C, D, E, and F in FIG. 11b respectively. The first threshold may be any integer that ranges from 1 to 8. In this embodiment, the first threshold is determined as 2.

A bitwise XOR operation is performed for the encoded rules that correspond to any two vertices respectively in the first weighted undirected graph. A result of the bitwise XOR operation is a bit string, and the number of 1s in the bit string is the weight of the side that connects the any two vertices. For example, vertices A and C correspond to the encoded rules 11101110 and 11101110 respectively. A bitwise XOR operation is performed for the encoded rules corresponding to the vertices A and C, and a result of the operation is 00000000. In the bit string, the number of 1s is 0. That is, the weight of the side that connects the vertices A and C is 0. Similarly, the weight of the side that connects the vertices A and B is 0, and the weight of the side that connects the vertices B and C is 0. For the weights of other sides in the first weighted undirected graph, refer to FIG. 11c, and the details are not described herein again. According to FIG. 11c, it is determined that the weight of a side with a minimum weight is 0. The weight of the side with the minimum weight is less than the first threshold, and therefore, it is required to determine a side for generating a new vertex. It may be randomly determined that the side connecting vertices A and C, or the side connecting vertices A and B, or the side connecting vertices B and C is the side for generating the new vertex. In this embodiment, the side connecting vertices A and C is selected as the side for generating a new vertex, and the weighted undirected graph shown in FIG. 12b is generated according to the new vertex A&C. In this case, the weighted undirected graph shown in FIG. 12b is the last generated weighted undirected graph among the weighted undirected graphs that are generated. The encoded rule corresponding to the vertex A&C is a result of a bitwise AND operation performed for encoded rules, where the encoded rules correspond respectively to two vertices of a side used for generating the new vertex A&C, that is, correspond respectively to the vertex A and vertex C. Herein, the result of the bitwise AND operation is 11101110. The vertices in the weighted undirected graph shown in FIG. 12b except the vertex A&C are the vertices in the weighted undirected graph shown in FIG. 11c, and specifically include vertices B, D, E, and F. For details about the encoded rules corresponding to the 5 vertices in the weighted undirected graph in FIG. 12b, refer to FIG. 12a.

A bitwise XOR operation is performed for the encoded rules that correspond to any two vertices respectively in the weighted undirected graph shown in FIG. 12b. A result of the bitwise XOR operation is a bit string, and the number of 1s in the bit string is the weight of the side that connects the any two vertices. For example, the weight of the side that connects the vertex A&C and the vertex B is 0. For the weights of other sides in the weighted undirected graph shown in FIG. 12b, refer to FIG. 12b. As seen from FIG. 12b, the side with the minimum weight in the weighted undirected graph shown in FIG. 12b is the side that connects the vertex A&C and the vertex B. The weight of the side with the minimum weight is less than the first threshold. The side that connects the vertex A&C and the vertex B is determined as a side for generating a new vertex.

Figures 13A, 13B, 14A:
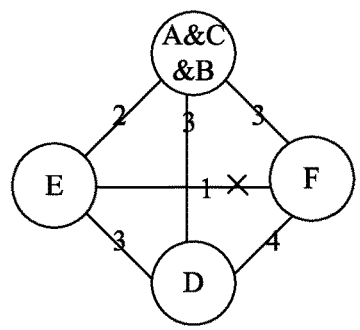
FIG. 13a shows an encoded rule set corresponding to a weighted undirected graph shown in FIG. 13b according to an embodiment of the present invention.
FIG. 13b shows a weighted undirected graph generated based on the weighted undirected graph shown in FIG. 12b according to an embodiment of the present invention.
FIG. 14a shows an encoded rule set corresponding to a weighted undirected graph shown in FIG. 14b according to an embodiment of the present invention.

According to the vertex A&C and the vertex B, a new vertex A&C&B is generated. Based on the vertex A&C&B and the weighted undirected graph shown in FIG. 12b, the weighted undirected graph shown in FIG. 13b is generated. In this case, the weighted undirected graph shown in FIG. 13b is the last generated weighted undirected graph among the weighted undirected graphs that are generated. Four vertices included in the weighted undirected graph shown in FIG. 13b are vertices A&C&B, D, E, and F respectively. Four encoded rules in the encoded rule set shown in FIG. 13a are in one-to-one correspondence to four vertices in the weighted undirected graph shown in FIG. 13b. A bitwise AND operation is performed for the encoded rules corresponding respectively to the vertex A&C and the vertex B in the weighted undirected graph shown in FIG. 12b, and a result of the bitwise AND operation is an encoded rule corresponding to the vertex A&C&B.

A bitwise XOR operation is performed for the encoded rules that correspond to any two vertices respectively in the weighted undirected graph shown in FIG. 13b. A result of the bitwise XOR operation is a bit string, and the number of 1s in the bit string is the weight of the side that connects the any two vertices. For example, the weight of the side that connects the vertex E and the vertex F is 1. For the weights of other sides in the weighted undirected graph shown in FIG. 13b, refer to FIG. 13b. As seen from FIG. 13b, the side with the minimum weight in the weighted undirected graph shown in FIG. 13b is the side that connects the vertex E and the vertex F. The weight of the side with the minimum weight is less than the first threshold. The side that connects the vertex E and the vertex F is determined as a side for generating a new vertex.

According to the vertex E and the vertex F, a new vertex E&F is generated. Based on the vertex E&F and the weighted undirected graph shown in FIG. 13b, the weighted undirected graph shown in FIG. 14b is generated. Three vertices included in the weighted undirected graph shown in FIG. 14b are vertices A&C&B, E&F, and D respectively. Three encoded rules in the encoded rule set shown in FIG. 14a are in one-to-one correspondence to three vertices in the weighted undirected graph shown in FIG. 14b. A bitwise AND operation is performed for the two encoded rules corresponding to the vertex E and the vertex F in the weighted undirected graph shown in FIG. 13b, and a result of the bitwise AND operation is an encoded rule corresponding to the vertex E&F.

A bitwise XOR operation is performed for the encoded rules that correspond to any two vertices respectively in the weighted undirected graph shown in FIG. 14b. A result of the bitwise XOR operation is a bit string, and the number of 1s in the bit string is the weight of the side that connects the any two vertices. For example, the weight of the side that connects the vertex A&C&B and the vertex D is 3. For the weights of other sides in the weighted undirected graph shown in FIG. 14b, refer to FIG. 14b. As seen from FIG. 14b, the side with the minimum weight in the weighted undirected graph shown in FIG. 14b is the side that connects the vertex A&C&B and the vertex D, and the side that connects the vertex A&C&B and the vertex E&F. The weight of the side with the minimum weight is greater than the first threshold. Therefore, the weighted undirected graph shown in FIG. 14b is the newly generated weighted undirected graph.

A decision tree is generated for a rule subset corresponding to each vertex respectively in the newly generated weighted undirected graph.

The newly generated weighted undirected graph includes three vertices: vertex A&C&B, vertex E&F, and vertex D.

The rule subset corresponding to the vertex A&C&B includes rules A0, B0, and C0. FIG. 15a is a schematic diagram of mapping the rules A0, B0, and C0 to a two-dimensional geometric space measured in metric units. FIG. 15b is a schematic diagram of a decision tree generated for the rule subset corresponding to the vertex A&C&B according to a HyperCuts algorithm. Evidently, in rules A0, B0, and C0, rule replication does not occur.

The rule subset corresponding to the vertex E&F includes rules E0 and F0. FIG. 16a is a schematic diagram of mapping the rules E0 and F0 to a two-dimensional geometric space measured in metric units. FIG. 16b is a schematic diagram of a decision tree generated for the rule subset corresponding to the vertex E&F according to a HyperCuts algorithm. Evidently, in rules E0 and F0, rule replication does not occur.

The rule subset corresponding to the vertex D includes the rule D0. FIG. 17a is a schematic diagram of mapping the rule D0 to a two-dimensional geometric space measured in metric units. FIG. 17b is a schematic diagram of a decision tree generated for the rule subset corresponding to the vertex D according to a HyperCuts algorithm. Evidently, in the rule D0, rule replication does not occur.

FIG. 18a is a schematic diagram of mapping multiple rules in the rule set shown in FIG. 11b to a two-dimensional geometric space measured in metric units.

Figure 18B:
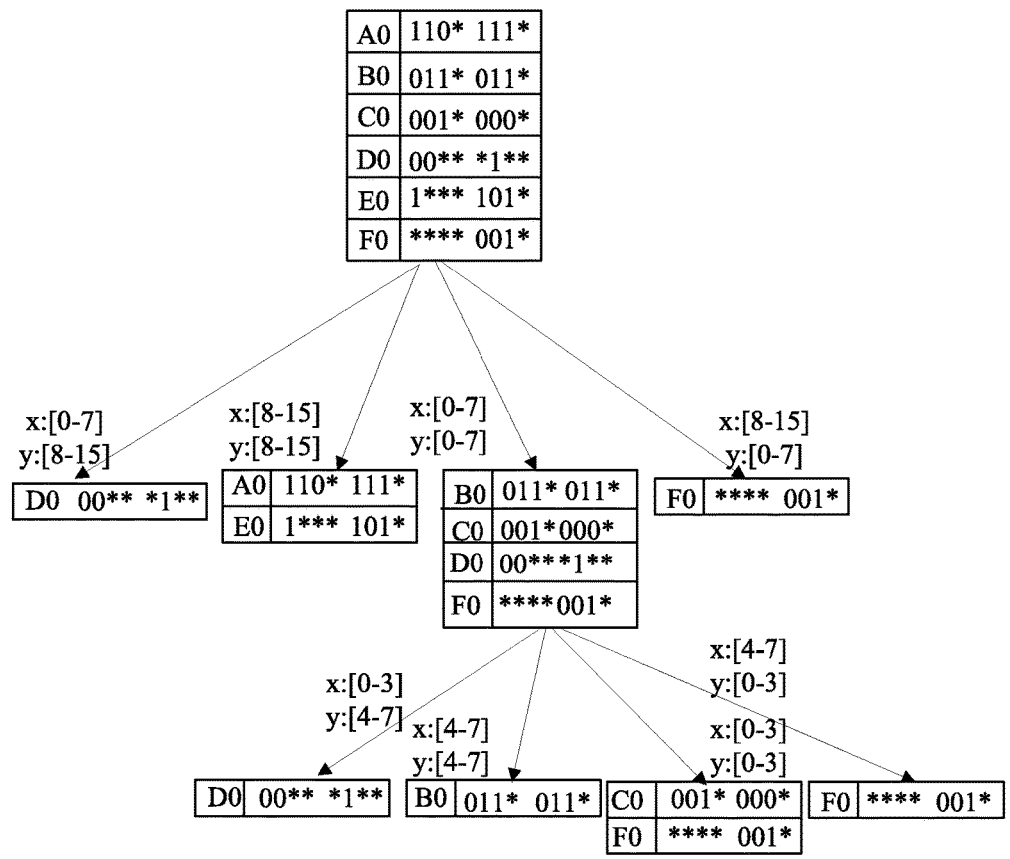
FIG. 18b is a schematic diagram of a decision tree generated based on the rule set shown in FIG. 11b according to an embodiment of the present invention.

FIG. 18b is a schematic diagram of a decision tree generated for the rule set shown in FIG. 11b according to a HyperCuts algorithm.

As seen from FIG. 18b, rules D0 and F0 are both replicated when the rule set is not cut according to the method provided in this embodiment. Therefore, compared with the prior art, the method provided in this embodiment can reduce the probability of rule replication.

Embodiment 3

Figure 19:
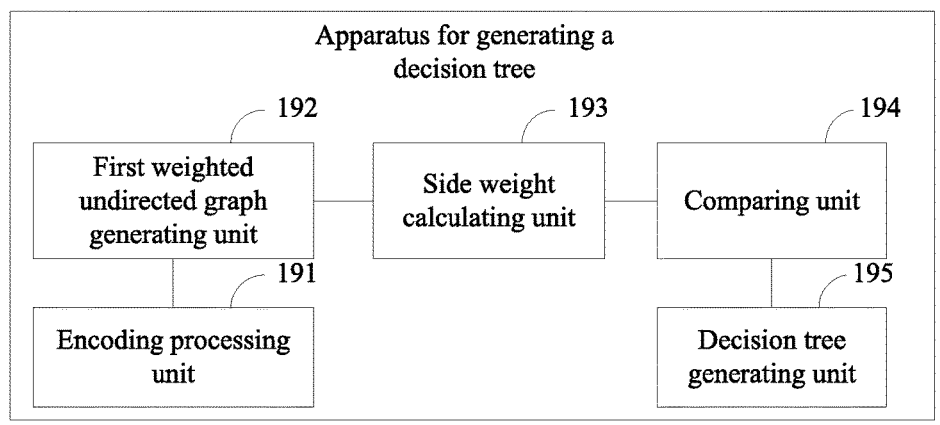
FIG. 19 is a schematic structural diagram of an apparatus for generating a decision tree according to an embodiment of the present invention.

FIG. 19 is a schematic structural diagram of an apparatus for generating a decision tree according to an embodiment of the present invention. The apparatus can be implemented according to the method provided in Embodiment 1. As shown in FIG. 19, the apparatus includes a number of units.

An encoding processing unit 191 is configured to generate an encoded rule set according to a rule set. The rule set includes multiple rules. Each rule is a string that includes 0, 1 or a wildcard, and any two rules are not equal in the multiple rules. The encoded rule set includes multiple encoded rules, and any two encoded rules are not equal in the multiple encoded rules. Each of the multiple encoded rules corresponds to at least one of the multiple rules, and each of the multiple rules corresponds to one of the multiple encoded rules. An encoded rule corresponding to a first rule is obtained by encoding the first rule according to a first function, the first rule is any one of the multiple rules, and the first function is used to replace multiple segments in the first rule with multiple code segments to obtain a first encoded rule. The first rule consists of the multiple segments, and each segment includes at least one character. The first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments. The first rule is a variable of the first function. The first encoded rule is a value of the first function; the first function is further used to calculate the first code segment according to the first segment. In a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment.

A first weighted undirected graph generating unit 192 is configured to generate a first weighted undirected graph according to the encoded rule set generated by the encoding processing unit 191. The first weighted undirected graph includes multiple vertices. The multiple vertices are in one-to-one correspondence to the multiple encoded rules. Each of the multiple vertices corresponds to a rule subset. A rule subset corresponding to a first vertex includes all rules, corresponding to the first encoded rule, in the multiple rules. The first vertex is any vertex in the first weighted undirected graph. The first encoded rule is an encoded rule, corresponding to the first vertex, in the multiple encoded rules.

A side weight calculating unit 193 is configured to calculate a weight of each side in the first weighted undirected graph according to the first weighted undirected graph generated by the first weighted undirected graph generating unit 192. A side that connects any two vertices in the first weighted undirected graph is a side of the first weighted undirected graph. A weight of a first side is a value of a second function that uses a second encoded rule and a third encoded rule as variables. Two vertices of the first side correspond to the second encoded rule and the third encoded rule respectively. The first side is any side in the first weighted undirected graph; and the second function is used to perform a bitwise operation for the second encoded rule and the third encoded rule and calculate the number of 1s in a result of the bitwise operation. The number of 1s in the result of the bitwise operation is a value of the second function.

A comparing unit 194, is configured to make comparison according to a calculation result of the side weight calculating unit 193. If a weight of a side with a maximum weight in the first weighted undirected graph is greater than a first threshold, where the first threshold is an integer greater than or equal to 0 but less than or equal to X−1, and X is the number of bits in the first encoded rule, the comparing unit 194 will perform the following operations cyclically until a weight of a side with a maximum weight in a newly generated weighted undirected graph is less than or equal to the first threshold, and then send a trigger signal to a decision tree generating unit 195: generating a new vertex according to the side with the maximum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the maximum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the maximum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the maximum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function.

The decision tree generating unit 195 is configured to generate a decision tree for a rule subset corresponding to each vertex respectively in the newly generated weighted undirected graph according to the trigger signal sent by the comparing unit 194.

If the weighted undirected graphs that are generated include only the first weighted undirected graph, the first weighted undirected graph is the last generated weighted undirected graph among the weighted undirected graphs that are generated.

There may be one or more sides with the maximum weight in the last generated weighted undirected graph among the weighted undirected graphs that are generated.

If there are multiple sides with the maximum weight in the last generated weighted undirected graph among the weighted undirected graphs that are generated, one of the sides may be selected randomly to generate the new vertex. If there are multiple sides with the maximum weight, the sum of rules included in the two rule subsets that correspond respectively to the two vertices of each of the sides may be calculated, and the new vertex is generated according to the side with the greatest sum of rules included in the two rule subsets that correspond respectively to the two vertices among the multiple sides with the maximum weight.

In addition, if there are multiple sides with the maximum weight in the last generated weighted undirected graph among the weighted undirected graphs that are generated, for (at least two) sides without a common vertex, (at least two) new vertices may be generated respectively, and a new weighted undirected graph may be generated according to the (at least two) new vertices. The common vertex refers to a vertex shared by two or more sides among the multiple sides with the maximum weight. It should be noted that, if there are multiple sides with the maximum weight in the last generated weighted undirected graph among the weighted undirected graphs that are generated, for two sides with a common vertex, new vertices cannot be generated respectively.

According to the technical solution provided in the embodiment of the present invention, each rule in a rule set is encoded to obtain an encoded rule set; a weighted undirected graph is created based on the encoded rule set; two vertices corresponding to a side with a maximum weight in the weighted undirected graph are combined until a weight of a side with a maximum weight in a newly generated weighted undirected graph meets a certain condition; and each vertex in the newly generated weighted undirected graph corresponds to a rule subset respectively. In this way, a rule set is cut into multiple rule subsets. The probability of rule replication in multiple decision trees obtained by executing a decision tree generating algorithm, such as Modular, respectively for the multiple rule subsets obtained by using the foregoing solution, is lower than the probability of rule replication in a decision tree obtained by executing the same decision tree generating algorithm for a rule set. Therefore, the technical solution provided in the embodiment of the present invention reduces the occurrence probability of rule replication.

In addition, the probability of rule replication in multiple decision trees obtained by executing a decision tree generating algorithm respectively for the multiple rule subsets obtained by the apparatus provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained by the apparatus provided in this embodiment, the speed of rule matching performed for multiple decision trees concurrently is higher than or equal to the speed of rule matching performed for one decision tree separately.

Optionally, in a scenario where the first segment includes one character: if the character in the first segment is 1, the first code segment is 1; if the character in the first segment is 0, the first code segment is 1; and if the character in the first segment is a wildcard, the first code segment is 0.

The above operation may be performed through the first function.

Optionally, the bitwise operation may be an AND operation, an OR operation, or an XOR operation.

Optionally, the decision tree generating unit is configured to generate a decision tree for a rule subset corresponding to each vertex respectively in the newly generated weighted undirected graph by using a Modular algorithm.

The technical solution of this embodiment is hereinafter specifically analyzed by using an example in which the bitwise operation is an AND operation and the first segment includes one character. That is, if the character in the first segment is 1, the first code segment is 1; if the character in the first segment is 0, the first code segment is 1; and if the character in the first segment is a wildcard, the first code segment is 0. In other words, the first segment may be 1, 0, or a wildcard. For ease of description, the first segment being 1 and the first segment being 0 are hereinafter uniformly called the first segment being a non-wildcard.

The first function is used to encode the first segment into a first code segment. Through encoding processing, for each rule in the rule set, the non-wildcard in the rule is encoded as 1, and the wildcard in the rule is encoded as 0. In a bit string obtained by performing a bitwise AND operation for two encoded rules, if a bit in a specific position in the bit string is 1, it indicates that two bits in a corresponding position in the two rules are both non-wildcards. By using this position as a reference position, rule replication is prevented. If a bit in a specific position in the bit string is 0, it indicates that at least one of the two bits in the corresponding position in the two rules is a wildcard. By using this position as a reference position, rule replication will inevitably occur.

The weight of a side in a weighted undirected graph is the number of 1s in a bit string obtained by performing a bitwise AND operation for two encoded rules. Therefore, a higher weight means that more positions in the two encoded rules can prevent rule replication and serve as reference positions. By using those positions as reference positions, rule replication can be prevented.

Figure 20:
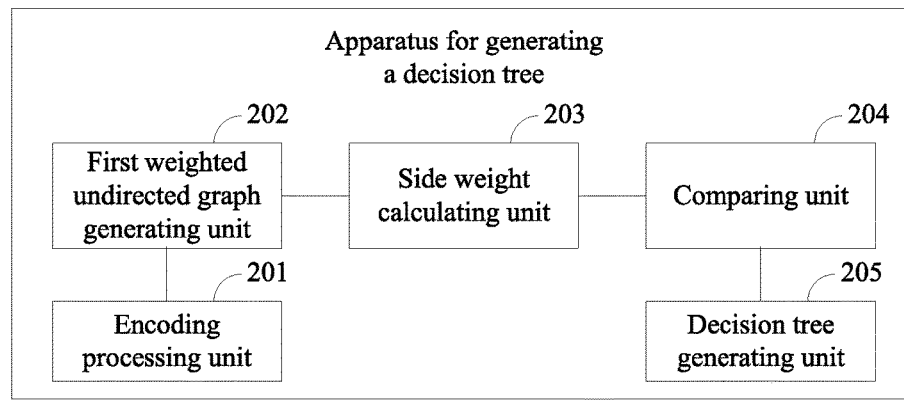
FIG. 20 is a schematic structural diagram of another apparatus for generating a decision tree according to an embodiment of the present invention.

FIG. 20 is a schematic structural diagram of another apparatus for generating a decision tree according to an embodiment of the present invention. The apparatus can be implemented according to the method provided in Embodiment 1. As shown in FIG. 20, the apparatus includes a number of units.

An encoding processing unit 201 is configured to generate an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment; and in a scenario where the first segment includes at least two characters, if the number of wildcards in the first segment is greater than or equal to N, the first code segment is 0, and, if the number of wildcards in the first segment is less than N, the first code segment is 1, where N is an integer greater than or equal to 1 but less than or equal to M, and M is the number of symbols in the first segment.

A first weighted undirected graph generating unit 202 is configured to generate a first weighted undirected graph according to the encoded rule set generated by the encoding processing unit 201, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules.

A side weight calculating unit 203 is configured to calculate a weight of each side in the first weighted undirected graph according to the first weighted undirected graph generated by the first weighted undirected graph generating unit 202, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function.

A comparing unit 204, configured to: make comparison according to a calculation result of the side weight calculating unit 203; and if a weight of a side with a minimum weight in the first weighted undirected graph is less than a first threshold, where the first threshold is an integer greater than or equal to 1 but less than or equal to X, and X is the number of bits in the first encoded rule, perform the following operations cyclically until a weight of a side with a minimum weight in a newly generated weighted undirected graph is greater than or equal to the first threshold, and then send a trigger signal to a decision tree generating unit 205: generating a new vertex according to the side with the minimum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function.

The decision tree generating unit 205, configured to generate a decision tree for a rule subset corresponding to each vertex respectively in the newly generated weighted undirected graph according to the trigger signal sent by the comparing unit 204.

If the weighted undirected graphs that are generated include only the first weighted undirected graph, the first weighted undirected graph is the last generated weighted undirected graph among the weighted undirected graphs that are generated.

There may be one or more sides with the minimum weight in the last generated weighted undirected graph among the weighted undirected graphs that are generated.

If there are multiple sides with the minimum weight in the last generated weighted undirected graph among the weighted undirected graphs that are generated, one of the sides may be selected randomly to generate the new vertex. If there are multiple sides with the minimum weight, the sum of rules included in the two rule subsets that correspond respectively to the two vertices of each of the sides may be calculated, and the new vertex is generated according to the side with the greatest sum of rules included in the two rule subsets that correspond respectively to the two vertices among the multiple sides with the minimum weight.

In addition, if there are multiple sides with the minimum weight in the last generated weighted undirected graph among the weighted undirected graphs that are generated, for (at least two) sides without a common vertex, (at least two) new vertices may be generated respectively, and a new weighted undirected graph may be generated according to the (at least two) new vertices. The common vertex refers to a vertex shared by two or more sides among the multiple sides with the minimum weight. It should be noted that, if there are multiple sides with the minimum weight in the last generated weighted undirected graph among the weighted undirected graphs that are generated, for two sides with a common vertex, new vertices cannot be generated respectively.

According to the technical solution provided in the embodiment of the present invention, each rule in a rule set is encoded to obtain an encoded rule set; a weighted undirected graph is created based on the encoded rule set; two vertices corresponding to a side with a minimum weight in the weighted undirected graph are combined until a weight of a side with a minimum weight in a newly generated weighted undirected graph meets a certain condition; and each vertex in the newly generated weighted undirected graph corresponds to a rule subset respectively. In this way, a rule set is cut into multiple rule subsets. The probability of rule replication in multiple decision trees obtained by executing a decision tree generating algorithm, such as Modular, respectively for the multiple rule subsets obtained by using the foregoing solution, is lower than the probability of rule replication in a decision tree obtained by executing the same decision tree generating algorithm for a rule set. Therefore, the technical solution provided in the embodiment of the present invention reduces the occurrence probability of rule replication.

In addition, the probability of rule replication in multiple decision trees obtained by executing a decision tree generating algorithm respectively for the multiple rule subsets obtained by the apparatus provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained by the apparatus provided in this embodiment, the speed of rule matching performed for multiple decision trees concurrently is higher than or equal to the speed of rule matching performed for one decision tree separately.

Optionally, the bitwise operation is an AND operation, an OR operation, or an XOR operation.

Optionally, in a scenario where the first segment includes one character: if the character in the first segment is 1, the first code segment is 0; if the character in the first segment is 0, the first code segment is 0; and if the character in the first segment is a wildcard, the first code segment is 1.

The above operation may be performed through the first function.

Optionally, the decision tree generating unit is configured to generate a decision tree for a rule subset corresponding to each vertex respectively in the newly generated weighted undirected graph by using a Modular algorithm.

The technical solution of this embodiment is hereinafter specifically analyzed by using an example in which the bitwise operation is an OR operation and the first segment includes one character. That is, if the character in the first segment is 1, the first code segment is 0; if the character in the first segment is 0, the first code segment is 0; and if the character in the first segment is a wildcard, the first code segment is 1. In other words, the first segment may be 1, 0, or a wildcard. For ease of description, the first segment being 1 and the first segment being 0 are hereinafter uniformly called the first segment being a non-wildcard.

The first function is used to encode the first segment into a first code segment. Through encoding processing, for each rule in the rule set, the non-wildcard in the rule is encoded as 0, and the wildcard in the rule is encoded as 1.

In a bit string obtained by performing a bitwise OR operation for two encoded rules, if a bit in a specific position in the bit string is 1, it indicates that at least one of two bits in a corresponding position in the two rules is a wildcard. By using this position as a reference position, rule replication will occur. If a bit in a specific position in the bit string is 0, it indicates that the two bits in the corresponding position in the two rules are both non-wildcards. By using this position as a reference position, rule replication is prevented.

The weight of a side in a weighted undirected graph is the number of 1s in a bit string obtained by performing a bitwise OR operation for two encoded rules. Therefore, a lower weight means that more positions in the two encoded rules can prevent rule replication and serve as reference positions. By using those positions as reference positions, rule replication can be prevented.

Figure 22:
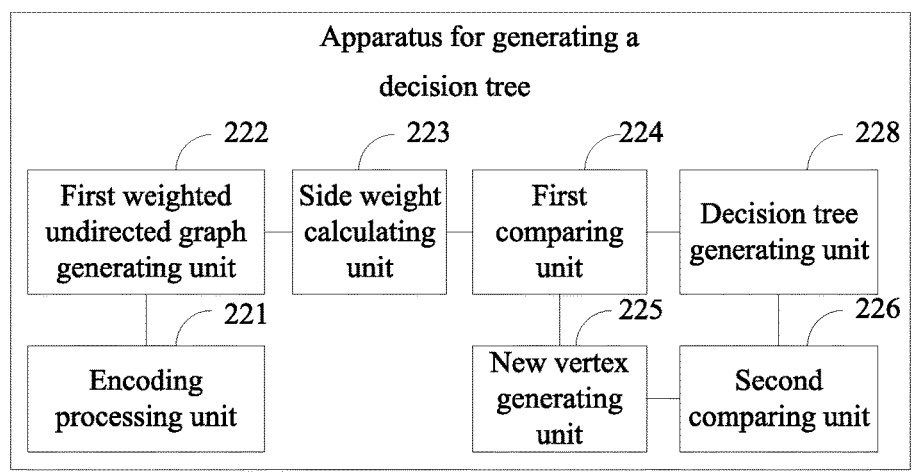
FIG. 22 is a schematic structural diagram of another apparatus for generating a decision tree according to an embodiment of the present invention.

The following describes the technical solution in the embodiment of the present invention by using an example with reference to FIG. 22.

In the following description, it is assumed that each rule in a rule set includes multiple segments, and that each segment includes 1 character. The apparatus shown in FIG. 22 includes the following:

An encoding processing unit 221 is configured to generate an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment.

FIG. 3a is a schematic diagram of a rule set and a corresponding encoded rule set, where rules a10, a20, a30, a40, a50, and a60 correspond to encoded rules a1, a2, a3, a4, a5, and a6, respectively.

The encoding manner used in FIG. 3a is: encoding "*" in the rule as 0, and encoding symbols other than "*" in the rule as 1, where "*" is a wildcard. In this embodiment, the meaning of "*" is: The value of the bit in the rule may be 0 or 1.

A first weighted undirected graph generating unit 222 is configured to generate a first weighted undirected graph according to the encoded rule set generated by the encoding processing unit 221, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules.

A side weight calculating unit 223 is configured to calculate a weight of each side in the first weighted undirected graph according to the first weighted undirected graph generated by the first weighted undirected graph generating unit 222, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function.

FIG. 3b shows the first weighted undirected graph generated based on the encoded rule set shown in FIG. 3a, where the encoded rules a1, a2, a3, a4, a5, and a6 correspond to vertices a1, a2, a3, a4, a5, and a6 in the first weighted undirected graph, respectively. In this embodiment, the first weighted undirected graph is an initially generated weighted undirected graph. In the weighted undirected graph shown in FIG. 3b: each vertex corresponds to an encoded rule; and the weight of a side that connects two vertices of any side can be obtained by performing a bitwise AND operation for the encoded rules corresponding to the two vertices. A result of the bitwise AND operation is a bit string. The weight of the side is the number of 1s in the result of the bitwise AND operation. A bitwise AND operation is performed for the encoded rules corresponding respectively to the two vertices connected to the any side to obtain a first operation result; and the number of 1s in the first operation result is counted. For example, vertices a1 and a3 of the first weighted undirected graph correspond to the encoded rules a1 and a3 respectively. A bitwise AND operation is performed for the encoded rules a1 and a3 to obtain an operation result that includes four 1s. Therefore, the weight of the side that connects vertices a1 and a3 in the first weighted undirected graph is 4. As shown in FIG. 3b, the side with the maximum weight in the first weighted undirected graph is the side that connects vertices a1 and a3.

A first comparing unit 224 is configured to: make comparison according to a calculation result of the side weight calculating unit 223; and if a weight of a side with a maximum weight in the first weighted undirected graph is greater than a first threshold, where the first threshold is an integer greater than or equal to 0 but less than or equal to X−1, and X is the number of bits in the first encoded rule, send a trigger signal to a new vertex generating unit 225; otherwise, send a trigger signal to a decision tree generating unit 228.

The first threshold is a decimal integer that ranges from 0 to 7.

As seen from FIG. 3a, through encoding processing, for each rule in the rule set, a non-wildcard in the rule is encoded as 1; and a wildcard in the rule is encoded as 0. In a bit string obtained by performing a bitwise AND operation for two encoded rules, if a bit in a specific position in the bit string is 1, it indicates that two bits in a corresponding position in the two rules are both non-wildcards. By using this position as a reference position, rule replication is prevented. If a bit in a specific position in the bit string is 0, it indicates that at least one of the two bits in the corresponding position in the two rules is a wildcard. By using this position as a reference position, rule replication will inevitably occur.

The weight of a side in a weighted undirected graph is the number of 1s in a bit string obtained by performing a bitwise AND operation for two encoded rules. Therefore, a higher weight means that more positions in the two encoded rules can prevent rule replication and serve as reference positions.

By using those positions as reference positions, rule replication can be prevented. In the first weighted undirected graph shown in FIG. 3b, the weight of the side that connects vertices a1 and a3 is the greatest. Vertices a1 and a3 correspond to the encoded rules a1 and a3 respectively. Therefore, the encoded rules a1 and a3 include the greatest number of positions that can prevent rule replication and serve as reference positions, and the number is 4. By using any one of the 4 positions as a reference position, rule replication can be prevented.

In FIG. 3b, vertices a1 and a3 correspond to two rule subsets respectively, where the rule subset corresponding to the vertex a1 includes the rule a10, and the rule subset corresponding to the vertex a3 includes the rule a30. In the weighted undirected graph in FIG. 4b, the rule subset corresponding to the vertex a1&a3 includes the rules a10 and a30. For the 2 rules included in the rule subset corresponding to the vertex a1 &a3, a total of 4 positions can serve as reference positions at which rule replication does not occur. Therefore, when a decision tree generating algorithm such as Modular is executed for the rule subset corresponding to the vertex a1&a3 to generate a decision tree, the occurrence probability of rule replication is relatively low.

It should be noted that in the first weighted undirected graph, the weight of the side that connects the vertices a3 and a4 is also 4. Therefore, the side that connects the vertices a3 and a4 is also the side with the maximum weight in the first weighted undirected graph. Either the side that connects the vertices a3 and a4 or the side that connects the vertices a3 and a1 may be selected randomly as the side eliminated. For example, in the embodiment of the present invention, the side that connects the vertices a3 and a1 is determined as a side for generating a new vertex.

The new vertex generating unit 225 is configured to generate a new vertex according to the side with the maximum weight in the last generated weighted undirected graph among weighted undirected graphs that are generated, and generate a new weighted undirected graph according to the new vertex, where: the new weighted undirected graph includes the new vertex and all vertices of the last generated weighted undirected graph except two vertices of the side with the maximum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the maximum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the maximum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function.

For example, before the weighted undirected graph shown in FIG. 4b is generated, the weighted undirected graph shown in FIG. 3b is the last generated weighted undirected graph among the weighted undirected graphs that are generated. A bitwise AND operation is performed for the encoded rules corresponding respectively to the vertices a1 and a3 in the weighted undirected graph shown in FIG. 3b to obtain the encoded rule corresponding to the vertex a1&a3 in the weighted undirected graph shown in FIG. 4b, and further obtain an updated encoded rule set shown in FIG. 4a. Multiple encoded rules included in the encoded rule set shown in FIG. 4a are respectively in one-to-one correspondence to multiple vertices in the newly generated weighted undirected graph shown in FIG. 4b. In this case, the weighted undirected graph shown in FIG. 4b is the newly generated weighted undirected graph. The weight of each side in the weighted undirected graph shown in FIG. 4b is calculated. The calculation method is the same as what is described above, and is not repeated herein.

A second comparing unit 226 is configured to: judge whether the weight of the side with the maximum weight in the newly generated weighted undirected graph is greater than or equal to the first threshold; and if yes, send a trigger signal to the new vertex generating unit 225; otherwise, send a trigger signal to the decision tree generating unit 228.

For example, the first threshold is preset to 1. Before the weighted undirected graph shown in FIG. 5b is generated, the weighted undirected graph shown in FIG. 4b is the last generated weighted undirected graph among the weighted undirected graphs that are generated. The side with the maximum weight in the weighted undirected graph shown in FIG. 4b is the side that connects the vertices a2 and a5. The weight of the side that connects the vertices a2 and a5 is 3. That is, the weight of the side with the maximum weight is greater than the first threshold. A bitwise AND operation is performed for the encoded rules corresponding respectively to the vertices a2 and a5, and a result of the bitwise AND operation is an encoded rule corresponding to a new vertex. The new vertex replaces the vertices a2 and a5 in the weighted undirected graph shown in FIG. 4b, and the weighted undirected graph shown in FIG. 5b is obtained. In this case, FIG. 5b is the newly generated weighted undirected graph. Multiple vertices included in the weighted undirected graph shown in FIG. 5b are in one-to-one correspondence to multiple encoded rules included in the encoded rule set shown in FIG. 5a. According to the encoded rules shown in FIG. 5a, the weight of each side in the weighted undirected graph shown in FIG. 5b is calculated.

In another example, before the weighted undirected graph shown in FIG. 6b is generated, FIG. 5b is the last generated weighted undirected graph among the weighted undirected graphs that are generated. The weight of the side with the maximum weight in the weighted undirected graph shown in FIG. 5b is 2. That is, the weight of the side with the maximum weight is greater than the first threshold. A bitwise AND operation is performed for the encoded rules corresponding respectively to the vertex a1 &a3 and the vertex a4, and a result of the bitwise AND operation is an encoded rule corresponding to a new vertex. The new vertex replaces the vertex a1 &a3 and the vertex a4 in FIG. 5b, and the weighted undirected graph shown in FIG. 6b is obtained. In this case, FIG. 6b is the newly generated weighted undirected graph. The 3 vertices included in the weighted undirected graph shown in FIG. 6b are in one-to-one correspondence to the 3 encoded rules included in the encoded rule set shown in FIG. 6a. According to the encoded rules shown in FIG. 6a, the weight of each side in the weighted undirected graph shown in FIG. 6b is calculated.

The weight of the side with the maximum weight in the weighted undirected graph shown in FIG. 6b is 1, that is, less than or equal to the first threshold. Therefore, the cutting of the rule set is complete. The rule subsets that correspond respectively to vertices in the weighted undirected graph shown in FIG. 6b are the multiple rule subsets obtained by cutting the rule set shown in FIG. 3a.

The decision tree generating unit 228 is configured to generate a decision tree for a rule subset corresponding to each vertex respectively in the newly generated weighted undirected graph.

The weighted undirected graph shown in FIG. 7b has 2 vertices: vertex a1&a3&a4&a6 and vertex a2&a5. The vertex a1&a3&a4&a6 and the vertex a2&a5 correspond respectively to two rule subsets. That is, the rule set shown in FIG. 3a is cut into two rule subsets, specifically as shown in FIG. 7c. The rule subset corresponding to the vertex a1&a3&a4&a6 includes rules a10, a30, a40, and a60, that is, {a10, a30, a40, a60}; and the rule subset corresponding to the vertex a2&a5 includes rules a20 and a50, that is, {a20, a50}. According to Modular, a decision tree is generated respectively for the two rule subsets shown in FIG. 7c.

If a preset traffic classifier supports concurrent rule matching for up to two decision trees, in this embodiment, the rule set shown in FIG. 3a is cut into two rule subsets, specifically as shown in FIG. 7c. By using a Modular algorithm, a decision tree is generated respectively for the two rule subsets shown in FIG. 7c. For details, refer to the decision tree shown in FIG. 8a and the decision tree shown in FIG. 8b. The decision tree shown in FIG. 9 is a decision tree generated for the rule set shown in FIG. 3a by using a Modular algorithm. The position marked by a dashed line in FIG. 9 is a reference position. As shown in FIG. 9, the rule whose reference position is 0 is placed on a next-level node on the left side; and the rule whose reference position is 1 is placed on a next-level node on the right side; and the rule whose reference position is * is placed on both the next-level nodes on the left side and the next-level node on the right side, and so on. The decision tree shown in FIG. 8a and the decision tree shown in FIG. 8b are compared with the decision tree shown in FIG. 9, and it is evident that the decision tree shown in FIG. 9 is taller and has a higher occurrence probability of rule replication. For example, rules a10, a20, a30, and a40 involve rule replication. The decision tree generated by the apparatus provided in the embodiment of the present invention is shorter, and has a lower occurrence probability of rule replication. In the decision trees shown in FIG. 8a and FIG. 8b, rule replication does not occur. Therefore, the decision tree generated by the apparatus provided in this embodiment has a lower probability of rule replication, and saves the storage space required for storing nodes of the decision tree.

The apparatus provided in this embodiment cuts a rule set into multiple rule subsets, and executes a decision tree generating algorithm to generate a decision tree for each rule subset respectively. A rule set includes multiple rules. For example, a rule included in the rule set may be a destination Internet Protocol address. The destination Internet Protocol address may include 32 bits or 128 bits. After the decision tree is generated, a network device receives an Internet Protocol packet. The traffic classifier may parse the received Internet Protocol packet to obtain the destination Internet Protocol address of the Internet Protocol packet. The traffic classifier may execute rule matching in multiple decision trees concurrently according to the destination Internet Protocol address. If a rule that matches the destination Internet Protocol address of the Internet Protocol packet is found in multiple decision trees, an action corresponding to the rule is performed. The apparatus for matching and searching in each decision tree is the same as that in the prior art, and is not detailed herein. In addition, if multiple rules match the Internet Protocol packet, the rule of the highest priority may be ultimately determined as a matching rule for the Internet Protocol packet according to the priority of each rule. An action corresponding to the ultimately matching rule, such as passing, discarding, traffic limiting, and bandwidth guarantee, is performed for the Internet Protocol packet.

When a new rule is added to the rule set, the apparatus provided in this embodiment can perform cutting processing for the new rule only. For example, the new rule is encoded by using the same encoding method to obtain a new encoded rule corresponding to the new rule, and a weighted undirected graph is generated based on the new encoded rule and the encoded rule set corresponding to the original rule set. Based on the weighted undirected graph, it is determined whether the new rule belongs to a rule subset in multiple rule subsets corresponding to the original rule set, or belongs to a new rule subset. For the former, the rule subset that includes the new rule may be updated, and a decision tree is generated again; for the latter, a decision tree may be generated based on the new rule subset. Therefore, in the apparatus provided in this embodiment, when a new rule is added to a rule set, it is not required to generate a decision tree again for all rule subsets obtained by cutting the original rule set, but required to generate a decision tree again for only the rule subset that includes the new rule or for only the new rule subset corresponding to the new rule.

Embodiment 4

Figure 21:
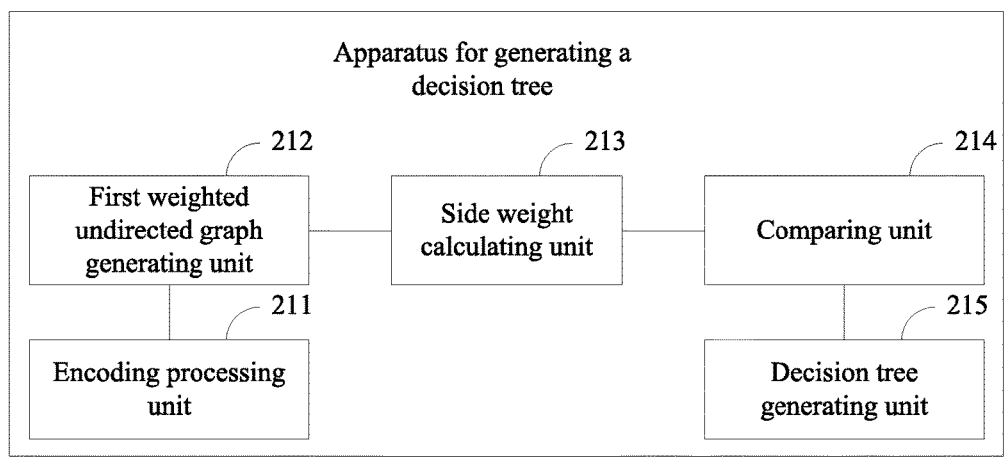
FIG. 21 is a schematic structural diagram of another apparatus for generating a decision tree according to an embodiment of the present invention.

FIG. 21 is a schematic structural diagram of an apparatus for generating a decision tree according to an embodiment of the present invention. The apparatus can be implemented according to the method provided in Embodiment 2. As shown in FIG. 21, the apparatus includes a number of units.

An encoding processing unit 211 is configured to generate an encoded rule set according to a rule set, where: the rule set includes multiple rules, each rule is a string that includes 0, 1 or a wildcard, and any two rules are not equal in the multiple rules; the encoded rule set includes multiple encoded rules, and any two encoded rules are not equal in the multiple encoded rules; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment includes at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment includes at least two characters, if the number of wildcards in the first segment is greater than or equal to N, the first code segment is 1, and, if the number of wildcards in the first segment is less than N, the first code segment is 0, where N is an integer greater than or equal to 1 but less than or equal to M, and M is the number of symbols in the first segment.

A first weighted undirected graph generating unit 212 is configured to generate a first weighted undirected graph according to the encoded rule set generated by the encoding processing unit 211, where: the first weighted undirected graph includes multiple vertices, the multiple vertices are in one-to-one correspondence to the multiple encoded rules, and each of the multiple vertices corresponds to a rule subset; a rule subset corresponding to a first vertex includes all rules, corresponding to the first encoded rule, in the multiple rules; the first vertex is any vertex in the first weighted undirected graph; and the first encoded rule is an encoded rule, corresponding to the first vertex, in the multiple encoded rules.

A side weight calculating unit 213 is configured to calculate a weight of each side in the first weighted undirected graph according to the first weighted undirected graph generated by the first weighted undirected graph generating unit 212, where: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of 1s in a result of the bitwise operation, where the number of 1s in the result of the bitwise operation is a value of the second function.

A comparing unit 214 is configured to make comparison according to a calculation result of the side weight calculating unit 213; and if a weight of a side with a minimum weight in the first weighted undirected graph is less than a first threshold, where the first threshold is an integer greater than or equal to 1 but less than or equal to X, and X is the number of bits in the first encoded rule, perform the following operations cyclically until a weight of a side with a minimum weight in a newly generated weighted undirected graph is greater than or equal to the first threshold, and then send a trigger signal to a decision tree generating unit 215: generating a new vertex according to the side with the minimum weight in the last generated weighted undirected graph among weighted undirected graphs that are generated, and generating a new weighted undirected graph according to the new vertex, where: the new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of 1s in a result of the bitwise operation, where the number of 1s in the result of the bitwise operation is a value of the fourth function.

The decision tree generating unit 215, configured to generate a decision tree for a rule subset corresponding to each vertex respectively in the newly generated weighted undirected graph according to the trigger signal sent by the comparing unit 214.

The new weighted undirected graph includes the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, where the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, where a result of the bitwise AND operation is a value of the third function; a rule subset corresponding to the new vertex includes all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; the fourth function is used to perform a bitwise operation for the sixth encoded rule and the seventh encoded rule and calculate the number of 1s in a result of the bitwise operation, where the number of 1s in the result of the bitwise operation is a value of the fourth function; and the bitwise operation is an AND operation, an OR operation, or an XOR operation, and the like.

If the weighted undirected graphs that are generated include only the first weighted undirected graph, the first weighted undirected graph is the last generated weighted undirected graph among the weighted undirected graphs that are generated.

There may be one or more sides with the minimum weight in the last generated weighted undirected graph among the weighted undirected graphs that are generated.

If there are multiple sides with the minimum weight in the last generated weighted undirected graph among the weighted undirected graphs that are generated, one of the sides may be selected randomly to generate the new vertex.

If there are multiple sides with the minimum weight, the sum of rules included in the two rule subsets that correspond respectively to the two vertices of each of the sides may be calculated, and the new vertex is generated according to the side with the greatest sum of rules included in the two rule subsets that correspond respectively to the two vertices among the multiple sides with the minimum weight.

In addition, if there are multiple sides with the minimum weight in the last generated weighted undirected graph among the weighted undirected graphs that are generated, for (at least two) sides without a common vertex, (at least two) new vertices may be generated respectively, and a new weighted undirected graph may be generated according to the (at least two) new vertices. The common vertex refers to a vertex shared by two or more sides among the multiple sides with the minimum weight. It should be noted that, if there are multiple sides with the minimum weight in the last generated weighted undirected graph among the weighted undirected graphs that are generated, for two sides with a common vertex, new vertices cannot be generated respectively.

According to the technical solution provided in the embodiment of the present invention, each rule in a rule set is encoded to obtain an encoded rule set; a weighted undirected graph is created based on the encoded rule set; two vertices corresponding to a side with a minimum weight in the weighted undirected graph are combined until a weight of a side with a minimum weight in a newly generated weighted undirected graph meets a certain condition; and each vertex in the newly generated weighted undirected graph corresponds to a rule subset respectively. In this way, a rule set is cut into multiple rule subsets. The probability of rule replication in multiple decision trees obtained by executing a decision tree generating algorithm, such as HyperCuts, respectively for the multiple rule subsets obtained by using the foregoing solution, is lower than the probability of rule replication in a decision tree obtained by executing the same decision tree generating algorithm for a rule set. Therefore, the technical solution provided in the embodiment of the present invention reduces the occurrence probability of rule replication.

In addition, the probability of rule replication in multiple decision trees obtained by executing a decision tree generating algorithm respectively for the multiple rule subsets obtained by the apparatus provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained by the apparatus provided in this embodiment, the speed of rule matching performed for multiple decision trees concurrently is higher than or equal to the speed of rule matching performed for one decision tree separately.

Optionally, the bitwise operation may be an AND operation, an OR operation, or an XOR operation.

Optionally, in a scenario where the first segment includes one character: if the character in the first segment is 1, the first code segment is 1; if the character in the first segment is 0, the first code segment is 1; and if the character in the first segment is a wildcard, the first code segment is 0.

The above operation may be performed through the first function.

Optionally, the decision tree generating unit 215 is configured to generate a decision tree for a rule subset corresponding to each vertex respectively in the newly generated weighted undirected graph by using a HyperCuts algorithm.

The technical solution of this embodiment is hereinafter specifically analyzed by using an example in which the bitwise operation is an XOR operation, the first segment includes one character, non-wildcards in the rule are encoded as 1s, and wildcards in the rule are encoded as 0s. That is, if the character in the first segment is 1, the first code segment is 1; if the character in the first segment is 0, the first code segment is 1; and if the character in the first segment is a wildcard, the first code segment is 0. In other words, the first segment may be 1, 0, or a wildcard. For ease of description, the first segment being 1 and the first segment being 0 are hereinafter uniformly called the first segment being a non-wildcard.

According to the technical solution provided in the embodiment of the present invention, a HyperCuts algorithm is executed to generate a decision tree for multiple rule subsets obtained through rule cutting. Rule cutting involves rules, encoded rules, and bitwise XOR operations. The following describes the relationship between the rule, the encoded rule, and the bitwise XOR operation that are involved in rule cutting:

Two rules are encoded respectively to obtain two encoded rules. In the two rules, if two bits in the same position are both non-wildcards, both are encoded as 1s. That is, after the two rules are encoded, two bits in the corresponding position in the two obtained encoded rules are both 1s. Therefore, a result of a bitwise XOR operation for the two bits in the corresponding position in the two encoded rules is 0.

Two rules are encoded respectively to obtain two encoded rules. In the two rules, if one of two bits in the same position is a non-wildcard, and the other is a wildcard, the two bits are encoded as 1 and 0 respectively. That is, after the two rules are encoded, two bits in the corresponding position in the two obtained encoded rules are 1 and 0 respectively. Therefore, a result of a bitwise XOR operation for the two bits in the corresponding position in the two encoded rules is 1.

Two rules are encoded respectively to obtain two encoded rules. In the two rules, if two bits in the same position are both wildcards, both are encoded as 0s. That is, after the two rules are encoded, two bits in the corresponding position in the two obtained encoded rules are both 0s. Therefore, a result of a bitwise XOR operation for the two bits in the corresponding position in the two encoded rules is 0.

As seen from the above analysis, a result of an XOR operation for two encoded rules is the number of occurrences of a first situation in the two rules, where the first situation is: In two bits in the same position in two encoded rules, one bit is a wildcard, and the other is a non-wildcard. If the bit position in which the first situation occurs is selected as a reference position, rule replication will occur. The weight of a side in a weighted undirected graph is the number of is in a bit string obtained by performing a bitwise XOR operation for two encoded rules. That is, the weight reflects the number of occurrences of the first situation. Obviously, if the number of occurrences of the first situation is smaller, there will be more positions that can prevent rule replication and serve as reference positions. By selecting those reference positions for cutting rules, rule replication can be prevented.

The technical solution of this embodiment is hereinafter specifically analyzed by using an example in which the bitwise operation is an XOR operation, the first segment includes one character, non-wildcards in the rule are encoded as 0s, and wildcards in the rule are encoded as 1s. That is, if the character in the first segment is 1, the first code segment is 0; if the character in the first segment is 0, the first code segment is 0; and if the character in the first segment is a wildcard, the first code segment is 1. In other words, the first segment may be 1, 0, or a wildcard. For ease of description, the first segment being 1 and the first segment being 0 are hereinafter uniformly called the first segment being a non-wildcard.

According to the technical solution provided in the embodiment of the present invention, a HyperCuts algorithm is executed to generate a decision tree for multiple rule subsets obtained through rule cutting. Rule cutting involves rules, encoded rules, and bitwise XOR operations. The following describes the relationship between the rule, the encoded rule, and the bitwise XOR operation that are involved in rule cutting:

Two rules are encoded respectively to obtain two encoded rules. In the two rules, if two bits in the same position are both non-wildcards, both are encoded as 0s. That is, after the two rules are encoded, two bits in the corresponding position in the two obtained encoded rules are both 0s. Therefore, a result of a bitwise XOR operation for the two bits in the corresponding position in the two encoded rules is 0.

Two rules are encoded respectively to obtain two encoded rules. In the two rules, if one of two bits in the same position is a non-wildcard, and the other is a wildcard, the two bits are encoded as 0 and 1 respectively. That is, after the two rules are encoded, two bits in the corresponding position in the two obtained encoded rules are 0 and 1 respectively. Therefore, a result of a bitwise XOR operation for the two bits in the corresponding position in the two encoded rules is 1.

Two rules are encoded respectively to obtain two encoded rules. In the two rules, if two bits in the same position are both wildcards, both are encoded as 1s. That is, after the two rules are encoded, two bits in the corresponding position in the two obtained encoded rules are both 1s. Therefore, a result of a bitwise XOR operation for the two bits in the corresponding position in the two encoded rules is 0.

As seen from the above analysis, a result of an XOR operation for two encoded rules is the number of occurrences of a second situation in the two rules, where the second situation is: In two bits in the same position in two encoded rules, one bit is a wildcard, and the other is a non-wildcard. If the bit position in which the second situation occurs is selected as a reference position, rule replication will occur. The weight of a side in a weighted undirected graph is the number of 1s in a bit string obtained by performing a bitwise XOR operation for two encoded rules. That is, the weight reflects the number of occurrences of the second situation. Obviously, if the number of occurrences of the second situation is smaller, there will be more positions that can prevent rule replication and serve as reference positions. By selecting those reference positions for cutting rules, rule replication can be prevented.

In addition, the probability of rule replication in multiple decision trees obtained by executing a decision tree generating algorithm respectively for the multiple rule subsets obtained by the apparatus provided in the embodiment of the present invention, is lower than the probability of rule replication in a decision tree obtained by executing the same decision tree generating algorithm for a rule set. It is therefore determined that the number of rules included in each rule subset is less than the number of rules included in a rule set. Therefore, the height of multiple decision trees generated for multiple rule subsets respectively by executing a decision tree generating algorithm, is less than or equal to the height of one decision tree generated for a rule set by executing the same decision tree generating algorithm. Regardless of other factors, the speed of rule matching is higher if the decision tree is shorter. Therefore, with multiple decision trees obtained by the apparatus provided in this embodiment, the speed of rule matching performed for multiple decision trees concurrently is higher than or equal to the speed of rule matching performed for one decision tree separately.

The following describes the technical solution in the embodiment of the present invention by using an example with reference to an accompanying drawing.

FIG. 11b is a schematic diagram of a rule set and a corresponding encoded rule set, where the rule set includes rules A0, B0, C0, D0, E0, and F0. The length of each rule is 8 bits. The rules A0, B0, C0, D0, E0, and F0 in the rule set correspond to A, B, C, D, E, and F in the encoded rule set respectively. The specific encoding manner is: encoding a non-wildcard as 1, and encoding a wildcard as 0.

In HyperCuts, a decision tree is created by putting different segments of a rule into different dimensions of a geometric space. FIG. 11a is a schematic diagram of mapping 6 rules in a rule set shown in FIG. 11b to a two-dimensional geometric space measured in metric units. Specifically, the rule set shown in FIG. 11b includes 6 rules, and the higher 4 bits and the lower 4 bits of each rule are respectively mapped to an X axis and a Y axis of a two-dimensional geometric space shown in FIG. 11a.

A first weighted undirected graph is generated. In this case, the first weighted undirected graph is the last generated weighted undirected graph among the weighted undirected graphs that are generated. FIG. 11c shows a first weighted undirected graph according to an embodiment of the present invention. In the first weighted undirected graph shown in FIG. 11c, vertices are A, B, C, D, E, and F respectively. The vertices A, B, C, D, E, and F correspond to a rule subset respectively. The rule subset corresponding to the vertex A includes the rule A0; the rule subset corresponding to the vertex A includes the rule A0; the rule subset corresponding to the vertex B includes the rule B0; the rule subset corresponding to the vertex C includes the rule C0; the rule subset corresponding to the vertex D includes the rule D0; the rule subset corresponding to the vertex E includes the rule E0; and the rule subset corresponding to the vertex F includes the rule F0.

Referring to FIG. 11c, the first weighted undirected graph includes 6 vertices, that is, A, B, C, D, E, and F. The vertices A, B, C, D, E, and F in FIG. 11c correspond to encoded rules A, B, C, D, E, and F in FIG. 11b respectively. The first threshold may be any integer that ranges from 1 to 8. In this embodiment, the first threshold is determined as 2.

A bitwise XOR operation is performed for the encoded rules that correspond to any two vertices respectively in the first weighted undirected graph. A result of the bitwise XOR operation is a bit string, and the number of 1s in the bit string is the weight of the side that connects the any two vertices. For example, vertices A and C correspond to the encoded rules 11101110 and 11101110 respectively. A bitwise XOR operation is performed for the encoded rules corresponding to the vertices A and C, and a result of the operation is 00000000. In the bit string, the number of 1s is 0. That is, the weight of the side that connects the vertices A and C is 0. Similarly, the weight of the side that connects the vertices A and B is 0, and the weight of the side that connects the vertices B and C is 0. For the weights of other sides in the first weighted undirected graph, refer to FIG. 11c, and the details are not described herein again. According to FIG. 11c, it is determined that the weight of a side with a minimum weight is 0. The weight of the side with the minimum weight is less than the first threshold, and therefore, it is required to determine a side for generating a new vertex. It may be randomly determined that the side connecting vertices A and C, or the side connecting vertices A and B, or the side connecting vertices B and C is the side for generating the new vertex. In this embodiment, the side connecting vertices A and C is selected as the side for generating a new vertex, and the weighted undirected graph shown in FIG. 12b is generated according to the new vertex A&C. In this case, the weighted undirected graph shown in FIG. 12b is the last generated weighted undirected graph among the weighted undirected graphs that are generated. The encoded rule corresponding to the vertex A&C is a result of a bitwise AND operation performed for encoded rules, where the encoded rules correspond respectively to two vertices of a side used for generating the new vertex A&C, that is, correspond respectively to the vertex A and vertex C. Herein, the result of the bitwise AND operation is 11101110. The vertices in the weighted undirected graph shown in FIG. 12b except the vertex A&C are the vertices in the weighted undirected graph shown in FIG. 11c, and specifically include vertices B, D, E, and F. For details about the encoded rules corresponding to the 5 vertices in the weighted undirected graph in FIG. 12b, refer to FIG. 12a.

A bitwise XOR operation is performed for the encoded rules that correspond to any two vertices respectively in the weighted undirected graph shown in FIG. 12b. A result of the bitwise XOR operation is a bit string, and the number of 1s in the bit string is the weight of the side that connects the any two vertices. For example, the weight of the side that connects the vertex A&C and the vertex B is 0. For the weights of other sides in the weighted undirected graph shown in FIG. 12b, refer to FIG. 12b. As seen from FIG. 12b, the side with the minimum weight in the weighted undirected graph shown in FIG. 12b is the side that connects the vertex A&C and the vertex B. The weight of the side with the minimum weight is less than the first threshold. The side that connects the vertex A&C and the vertex B is determined as a side for generating a new vertex.

According to the vertex A&C and the vertex B, a new vertex A&C&B is generated. Based on the vertex A&C&B and the weighted undirected graph shown in FIG. 12b, the weighted undirected graph shown in FIG. 13b is generated. In this case, the weighted undirected graph shown in FIG. 13b is the last generated weighted undirected graph among the weighted undirected graphs that are generated. Four vertices included in the weighted undirected graph shown in FIG. 13b are vertices A&C&B, D, E, and F respectively. Four encoded rules in the encoded rule set shown in FIG. 13a are in one-to-one correspondence to four vertices in the weighted undirected graph shown in FIG. 13b. A bitwise AND operation is performed for the encoded rules corresponding respectively to the vertex A&C and the vertex B in the weighted undirected graph shown in FIG. 12b, and a result of the bitwise AND operation is an encoded rule corresponding to the vertex A&C&B.

A bitwise XOR operation is performed for the encoded rules that correspond to any two vertices respectively in the weighted undirected graph shown in FIG. 13b. A result of the bitwise XOR operation is a bit string, and the number of 1s in the bit string is the weight of the side that connects the any two vertices. For example, the weight of the side that connects the vertex E and the vertex F is 1. For the weights of other sides in the weighted undirected graph shown in FIG. 13b, refer to FIG. 13b. As seen from FIG. 13b, the side with the minimum weight in the weighted undirected graph shown in FIG. 13b is the side that connects the vertex E and the vertex F. The weight of the side with the minimum weight is less than the first threshold. The side that connects the vertex E and the vertex F is determined as a side for generating a new vertex.

According to the vertex E and the vertex F, a new vertex E&F is generated. Based on the vertex E&F and the weighted undirected graph shown in FIG. 13b, the weighted undirected graph shown in FIG. 14b is generated. Three vertices included in the weighted undirected graph shown in FIG. 14b are vertices A&C&B, E&F, and D respectively. Three encoded rules in the encoded rule set shown in FIG. 14a are in one-to-one correspondence to three vertices in the weighted undirected graph shown in FIG. 14b. A bitwise AND operation is performed for the two encoded rules corresponding to the vertex E and the vertex F in the weighted undirected graph shown in FIG. 13b, and a result of the bitwise AND operation is an encoded rule corresponding to the vertex E&F.

A bitwise XOR operation is performed for the encoded rules that correspond to any two vertices respectively in the weighted undirected graph shown in FIG. 14b. A result of the bitwise XOR operation is a bit string, and the number of 1s in the bit string is the weight of the side that connects the any two vertices. For example, the weight of the side that connects the vertex A&C&B and the vertex D is 3. For the weights of other sides in the weighted undirected graph shown in FIG. 14b, refer to FIG. 14b. As seen from FIG. 14b, the side with the minimum weight in the weighted undirected graph shown in FIG. 14b is the side that connects the vertex A&C&B and the vertex D, and the side that connects the vertex A&C&B and the vertex E&F. The weight of the side with the minimum weight is greater than the first threshold. Therefore, the weighted undirected graph shown in FIG. 14b is the newly generated weighted undirected graph.

A decision tree is generated for a rule subset corresponding to each vertex respectively in the newly generated weighted undirected graph.

The newly generated weighted undirected graph includes three vertices: vertex A&C&B, vertex E&F, and vertex D.

The rule subset corresponding to the vertex A&C&B includes rules A0, B0, and C0. FIG. 15a is a schematic diagram of mapping the rules A0, B0, and C0 to a two-dimensional geometric space measured in metric units. FIG. 15b is a schematic diagram of a decision tree generated for the rule subset corresponding to the vertex A&C&B according to a HyperCuts algorithm. Evidently, in rules A0, B0, and C0, rule replication does not occur.

The rule subset corresponding to the vertex E&F includes rules E0 and F0. FIG. 16a is a schematic diagram of mapping the rules E0 and F0 to a two-dimensional geometric space measured in metric units. FIG. 16b is a schematic diagram of a decision tree generated for the rule subset corresponding to the vertex E&F according to a HyperCuts algorithm. Evidently, in rules E0 and F0, rule replication does not occur.

The rule subset corresponding to the vertex D includes the rule D0. FIG. 17a is a schematic diagram of mapping the rule D0 to a two-dimensional geometric space measured in metric units. FIG. 17b is a schematic diagram of a decision tree generated for the rule subset corresponding to the vertex D according to a HyperCuts algorithm. Evidently, in the rule D0, rule replication does not occur.

FIG. 18a is a schematic diagram of mapping multiple rules in the rule set shown in FIG. 11b to a two-dimensional geometric space measured in metric units.

FIG. 18b is a schematic diagram of a decision tree generated for the rule set shown in FIG. 11b according to a HyperCuts algorithm.

As seen from FIG. 18b, rules D0 and F0 are both replicated when the rule set is not cut according to the solution provided in this embodiment. Therefore, compared with the prior art, the apparatus provided in this embodiment can reduce the probability of rule replication.

In the foregoing embodiments, the description of each of the embodiments has respective focuses. For a part that is not described in detail in a certain embodiment, reference may be made to related descriptions in other embodiments.

All functional units in the embodiments of the present invention may be integrated into one unit, or each of the functional units may exist alone physically, or two or more functional units are integrated into one unit. The integrated unit may be implemented through hardware, or may also be implemented in a form of hardware plus a software functional module.

It may be understood by a person of ordinary skill in the art that, the accompanying drawings are merely schematic diagrams of embodiments, and modules or processes in the accompanying drawings are not necessarily required for implementing the present invention.

A person of ordinary skill in the art may understand that, modules in the apparatuses provided in the embodiment may be arranged in the apparatuses in a distributed manner according to the description of the embodiment, or may be arranged in one or more apparatuses which are different from those described in the embodiments. The modules in the foregoing embodiments may be combined into one module, or split into multiple sub-modules.

A person of ordinary skill in the art may understand that, all or a part of the steps of the foregoing method embodiments may be implemented by a program instructing relevant hardware. The aforementioned program may be stored in a computer readable storage medium. When the program runs, the steps of the foregoing method embodiments are performed. The foregoing storage medium includes various media capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, it should be understood that a person of ordinary skill in the art may still make modifications to the technical solutions described in the foregoing embodiments, or make equivalent replacements to some technical features thereof, as long as such modifications and replacements do not cause the essence of corresponding technical solutions to depart from the spirit and scope of the technical solutions of the embodiments of the present invention.

What is claimed is:

1. A method for generating a decision tree for packet classification, the method comprising:

generating, by an apparatus, an encoded rule set according to a rule set, wherein the rule set comprises multiple rules, each rule is a string that comprises 0, 1 or a wildcard, and the strings of any two rules are not the same, the encoded rule set comprises multiple encoded rules, and the strings of any two encoded rules are not the same, each of the multiple encoded rules corresponds to at least one of the multiple rules, and each of the multiple rules corresponds to one of the multiple encoded rules, an encoded rule corresponding to a first rule is obtained by encoding the first rule according to a first function, the first rule is any one of the multiple rules, the first function is used to replace multiple segments in the first rule with multiple code segments to obtain a first encoded rule, the first rule comprises the multiple segments, each segment comprises at least one character, the first encoded rule comprises the multiple code segments, each code segment is a bit, the multiple segments are in one-to-one correspondence to the multiple code segments, a position of a first segment in the first rule is consistent with a position of a first code segment in the first encoded rule, the first segment is any one of the multiple segments, the first code segment is a code segment, corresponding to the first segment, in the multiple code segments, the first rule is a variable of the first function, the first encoded rule is a value of the first function, the first function is further used to calculate the first code segment according to the first segment, wherein in a scenario where the first segment comprises at least two characters, if the number of wildcards in the first segment is greater than or equal to N, the first code segment is 1, and, if the number of wildcards in the first segment is less than N, the first code segment is 0, wherein N is an integer greater than or equal to 1 but less than or equal to M, M is the number of symbols in the first segment, and each wildcard represents a single character, and wherein the apparatus comprises a network processor configured with a traffic classifier;

generating, by the apparatus, a first weighted undirected graph, wherein the first weighted undirected graph comprises multiple vertices, the multiple vertices are in one-to-one correspondence to the multiple encoded rules, and each of the multiple vertices corresponds to a rule subset, the rule subset corresponding to a first vertex comprises all rules corresponding to the first encoded rule in the multiple rules, the first vertex is any vertex in the first weighted undirected graph, and the first encoded rule is an encoded rule, corresponding to the first vertex, in the multiple encoded rules;

calculating, by the apparatus, a weight of each side in the first weighted undirected graph, wherein a side that connects any two vertices in the first weighted undirected graph is a side of the first weighted undirected graph, a weight of a first side is a value of a second function that uses a second encoded rule and a third encoded rule as variables, two vertices of the first side correspond to the second encoded rule and the third encoded rule respectively, the first side is any side in the first weighted undirected graph, and the second function is used to perform a bitwise operation for the second encoded rule and the third encoded rule and calculate the number of is in a result of the bitwise operation, wherein the number of is in the result of the bitwise operation is a value of the second function;

if a weight of a side with a maximum weight in the first weighted undirected graph is greater than a first threshold, performing, by the apparatus, generation operations cyclically until a weight of a side with a maximum weight in a newly generated weighted undirected graph is less than or equal to the first threshold, wherein the first threshold is an integer greater than or equal to 0 but less than or equal to X−1, and X is the number of bits in the first encoded rule, wherein the generation operations comprise generating a new vertex according to the side with the maximum weight in the last generated weighted undirected graph among weighted undirected graphs that are generated, and generating a new weighted undirected graph according to the new vertex, wherein the new weighted undirected graph comprises the new vertex and all vertices of the last generated weighted undirected graph except two vertices of the side with the maximum weight among the weighted undirected graphs that are generated, and encoded rule corresponding to the new vertex is a value of a third function that uses a fourth encoded rule and a fifth encoded rule as variables, the fourth encoded rule and the fifth encoded rule correspond to the two vertices of the side with the maximum weight respectively in the last generated weighted undirected graph among the weighted undirected graphs that are generated, the third function is used to perform a bitwise AND operation for the fourth encoded rule and the fifth encoded rule, a result of the bitwise AND operation is a value of the third function, a rule subset corresponding to the new vertex comprises all rules in rule subsets that correspond to the two vertices of the side with the maximum weight respectively in the last generated weighted undirected graph among the weighted undirected graphs that are generated, a weight of a second side in the new weighted undirected graph is a value of a fourth function that uses a sixth encoded rule and a seventh encoded rule as variables, two vertices of the second side correspond to the sixth encoded rule and the seventh encoded rule respectively, the second side is any side in the new weighted undirected graph, and the fourth function is used to perform a bitwise operation for the sixth encoded rule and the seventh encoded rule and calculate the number of is in a result of the bitwise operation, wherein the number of is in the result of the bitwise operation is a value of the fourth function;

generating, by the apparatus, a decision tree for a rule subset corresponding to each vertex respectively in the newly generated weighted undirected graph;

storing, in a non-transitory memory of the apparatus, the decision tree;

receiving, by a network device, an internet protocol packet, and matching, by the apparatus, a rule of the stored decision tree with a field of the received internet protocol packet; and performing an action, by the apparatus, the action corresponding to the determined rule that matches the field of the internet protocol packet, the action corresponding to passing, discarding, traffic limiting, or bandwidth guaranteeing, the internet protocol packet.

2. The method according to claim 1, wherein the bitwise operation is an AND operation, an OR operation, or an XOR operation.

3. The method according to claim 1, wherein the first segment comprises one character;
wherein the first code segment is 1 when the character in the first segment is 1;
wherein the first code segment is 1 when the character in the first segment is 0; and
wherein the first code segment is 0 when the character in the first segment is a wildcard.

4. The method according to claim 1, wherein generating the decision tree for the rule subset corresponding to each vertex respectively in the newly generated weighted undirected graph comprises generating the decision tree for ft the rule subset corresponding to each vertex respectively in the newly generated weighted undirected graph by using a Modular algorithm.

5. A method for generating a decision tree for packet classification, comprising:
generating, by an apparatus, an encoded rule set according to a rule set, wherein the rule set comprises multiple rules, each rule is a string that comprises 0, 1 or a wildcard, and the strings of any two rules are not the same, the encoded rule set comprises multiple encoded rules, the strings of any two encoded rules are not the same, each of the multiple encoded rules corresponds to at least one of the multiple rules, each of the multiple rules corresponds to one of the multiple encoded rules; an encoded rule corresponding to a first rule is obtained by encoding the first rule according to a first function, the first rule is any one of the multiple rules, the first function is used to replace multiple segments in the first rule with multiple code segments to obtain a first encoded rule, the first rule comprises the multiple segments, each segment comprises at least one character, the first encoded rule comprises the multiple code segments, each code segment is a bit, the multiple segments are in one-to-one correspondence to the multiple code segments, a position of a first segment in the first rule is consistent with a position of a first code segment in the first encoded rule, the first segment is any one of the multiple segments, the first code segment is a code segment, corresponding to the first segment, in the multiple code segments; the first rule is a variable of the first function, the first encoded rule is a value of the first function, the first function is further used to calculate the first code segment according to the first segment, wherein, in a scenario where the first segment comprises at least two characters, if the number of wildcards in the first segment is greater than or equal to N, the first code segment is 1, and, if the number of wildcards in the first segment is less than N, the first code segment is 0, wherein N is an integer greater than or equal to 1 but less than or equal to M, M is the number of symbols in the first segment and each wildcard represents a single character; and in a scenario where the first segment comprises at least two characters, if the number of wildcards in the first segment is greater than or equal to N, the first code segment is 0, and, if the number of wildcards in the first segment is less than N, the first code segment is 1, wherein N is an integer greater than or equal to 1 but less than or equal to M, M is the number of symbols in the first segment, and each wildcard represents a single character, and wherein the apparatus comprises a network processor configured with a traffic classifier;

generating, by the apparatus, a first weighted undirected graph, wherein the first weighted undirected graph comprises multiple vertices, the multiple vertices are in one-to-one correspondence to the multiple encoded rules, each of the multiple vertices corresponds to a rule subset, ft the rule subset corresponding to a first vertex comprises all rules, corresponding to the first encoded rule, in the multiple rules, the first vertex is any vertex in the first weighted undirected graph, and the first encoded rule is an encoded rule, corresponding to the first vertex, in the multiple encoded rules;

calculating, by the apparatus, a weight of each side in the first weighted undirected graph, wherein a side that connects any two vertices in the first weighted undirected graph is a side of the first weighted undirected graph, a weight of a first side is a value of a second function that uses a second encoded rule and a third encoded rule as variables, two vertices of the first side correspond to the second encoded rule and the third encoded rule respectively, the first side is any side in the first weighted undirected graph, and the second function is used to perform a bitwise operation for the second encoded rule and the third encoded rule and calculate the number of is in a result of the bitwise operation, wherein the number of is in the result of the bitwise operation is a value of the second function;

if a weight of a side with a minimum weight in the first weighted undirected graph is less than a first threshold, wherein the first threshold is an integer greater than or equal to 1 but less than or equal to X, and X is the number of bits in the first encoded rule, performing, by the apparatus, generation operations cyclically until a weight of a side with a minimum weight in a newly generated weighted undirected graph is greater than or equal to the first threshold, wherein the generation operations comprise generating a new vertex according to the side with the minimum weight in the last generated weighted undirected graph among weighted undirected graphs that are generated, and generating a new weighted undirected graph according to the new vertex, wherein the new weighted undirected graph comprises the new vertex and all vertices of the last generated weighted undirected graph except two vertices of the side with the minimum weight among the weighted undirected graphs that are generated, and encoded rule corresponding to the new vertex is a value of a third function that uses a fourth encoded rule and a fifth encoded rule as variables, wherein the fourth encoded rule and the fifth encoded rule correspond to the two vertices of the side with the minimum weight respectively in the last generated weighted undirected graph among the weighted undirected graphs that are generated, the function is used to perform a bitwise AND operation for the fourth encoded rule and the fifth encoded rule, wherein a result of the bitwise AND operation is a value of the third function, a rule subset corresponding to the new vertex comprises all rules in rule subsets that correspond to the two vertices of the side with the minimum weight respectively in the last generated weighted undirected graph among the weighted undirected graphs that are generated, a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph, and the fourth function is used to perform a bitwise operation for the sixth encoded rule and the seventh encoded rule and calculate the number of is in a result of the bitwise operation, wherein the number of is in the result of the bitwise operation is a value of the fourth function;

generating, by the apparatus, a decision tree for a rule subset corresponding to each vertex respectively in the newly generated weighted undirected graph;

storing, in a non-transitory memory of the apparatus, the decision tree;

receiving, by a network device, an internet protocol packet, and matching, by the apparatus, a rule of the stored decision tree with a field of the received internet protocol packet; and performing an action, by the apparatus, the action corresponding to the determined rule that matches the field of the internet protocol packet, the action corresponding to passing, discarding, traffic limiting, or bandwidth guaranteeing, the internet protocol packet.

6. The method according to claim 5, wherein the bitwise operation is an AND operation, an OR operation, or an XOR operation.

7. The method according to claim 5, wherein the first segment comprises one character;
wherein the first code segment is 0 when the character in the first segment is 1;
wherein the first code segment is 0 when the character in the first segment is 0; and
wherein the first code segment is 1 when the character in the first segment is a wildcard.

8. The method according to claim 5, wherein generating the decision tree for the rule subset corresponding to each vertex respectively in the newly generated weighted undirected graph comprises generating the decision tree for the rule subset corresponding to each vertex respectively in the newly generated weighted undirected graph by using a Modular algorithm.

9. A method for generating a decision tree for packet classification, the method comprising:
generating, by an apparatus, an encoded rule set according to a rule set, wherein the rule set comprises multiple rules, each rule is a string that comprises 0, 1 or a wildcard, the strings of any two rules are not the same, the encoded rule set comprises multiple encoded rules, the strings of any two encoded rules are not the same, each of the multiple encoded rules corresponds to at least one of the multiple rules, each of the multiple rules corresponds to one of the multiple encoded rules, and encoded rule corresponding to a first rule is obtained by encoding the first rule according to a first function, the first rule is any one of the multiple rules, the first function is used to replace multiple segments in the first rule with multiple code segments to obtain a first encoded rule, the first rule comprises the multiple segments, each segment comprises at least one character, the first encoded rule comprises the multiple code segments, each code segment is a bit, the multiple segments are in one-to-one correspondence to the multiple code segments, a position of a first segment in the first rule is consistent with a position of a first code segment in the first encoded rule, the first segment is any one of the multiple segments, the first code segment is a code segment, corresponding to the first segment, in the multiple code segments, the first rule is a variable of the first function, the first encoded rule is a value of the first function, the first function is further used to calculate the first code segment according to the first segment, wherein, in a scenario where the first segment comprises at least two characters, if the number of wildcards in the first segment is greater than or equal to N, the first code segment is 1, and, if the number of wildcards in the first segment is less than N, the first code segment is 0, wherein N is an integer greater than or equal to 1 but less than or equal to M, M is the number of symbols in the first segment, and each wildcard represents a single character, and wherein the apparatus comprises a network processor configured with a traffic classifier;

generating, by the apparatus, a first weighted undirected graph, wherein the first weighted undirected graph comprises multiple vertices, the multiple vertices are in one-to-one correspondence to the multiple encoded rules, each of the multiple vertices corresponds to a rule subset, the rule subset corresponding to a first vertex comprises all rules, corresponding to the first encoded rule, in the multiple rules, the first vertex is any vertex in the first weighted undirected graph, and the first encoded rule is an encoded rule, corresponding to the first vertex, in the multiple encoded rules;

calculating, by the apparatus, a weight of each side in the first weighted undirected graph, wherein a side that connects any two vertices in the first weighted undirected graph is a side of the first weighted undirected graph, a weight of a first side is a value of a second function that uses a second encoded rule and a third encoded rule as variables, two vertices of the first side correspond to the second encoded rule and the third encoded rule respectively, the first side is any side in the first weighted undirected graph, and the second function is used to perform a bitwise operation for the second encoded rule and the third encoded rule and calculate the number of is in a result of the bitwise operation, wherein the number of is in the result of the bitwise operation is a value of the second function;

if a weight of a side with a minimum weight in the first weighted undirected graph is less than a first threshold, wherein the first threshold is an integer greater than or equal to 1 but less than or equal to X, and X is the number of bits in the first encoded rule, performing, by the apparatus, generation operations cyclically until a weight of a side with a minimum weight in a newly generated weighted undirected graph is greater than or equal to the first threshold, wherein the generation operations comprise generating a new vertex according to the side with the minimum weight in the last generated weighted undirected graph among weighted undirected graphs that are generated, and generating a new weighted undirected graph according to the new vertex, wherein the new weighted undirected graph comprises the new vertex and all vertices of the last generated weighted undirected graph except two vertices of the side with the minimum weight among the weighted undirected graphs that are generated, and encoded rule corresponding to the new vertex is a value of a third function that uses a fourth encoded rule and a fifth encoded rule as variables, wherein the fourth encoded rule and the fifth encoded rule correspond to the two vertices of the side with the minimum weight respectively in the last generated weighted undirected graph among the weighted undirected graphs that are generated, the third function is used to perform a bitwise AND operation for the fourth encoded rule and the fifth encoded rule, wherein a result of the bitwise AND operation is a value of the third function; a rule subset corresponding to the new vertex comprises all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively, the second side is any side in the new weighted undirected graph, and the fourth function is used to perform a bitwise operation for the sixth encoded rule and the seventh encoded rule and calculate the number of is in a result of the bitwise operation, wherein the number of is in the result of the bitwise operation is a value of the fourth function;

generating, by the apparatus, a decision tree for a rule subset corresponding to each vertex respectively in the newly generated weighted undirected graph;

storing, in a non-transitory memory of the apparatus, the decision tree;

receiving, by a network device, an internet protocol packet, and matching, by the apparatus, a rule of the stored decision tree with a field of the received internet protocol packet; and performing an action, by the apparatus, the action corresponding to the determined rule that matches the field of the internet protocol packet, the action corresponding to passing, discarding, traffic limiting, or bandwidth guaranteeing the internet protocol packet.

10. The method according to claim 9, wherein the bitwise operation is an AND operation, an OR operation, or an XOR operation.

11. The method according to claim 9, wherein the first segment comprises one character;
wherein the first code segment is 0 when the character in the first segment is 1;
wherein the first code segment is 0 when the character in the first segment is 0; and
wherein the first code segment is 1 when the character in the first segment is a wildcard.

12. The method according to claim 9, wherein the first segment comprises one character;
wherein the first code segment is 1 when the character in the first segment is 1;
wherein the first code segment is 1 when the character in the first segment is 0; and
wherein the first code segment is 1 when the character in the first segment is a wildcard.

13. The method according to claim 9, wherein generating the decision tree for the rule subset corresponding to each vertex respectively in the newly generated weighted undirected graph comprises generating the decision tree for the rule subset corresponding to each vertex respectively in the newly generated weighted undirected graph by using a HyperCuts algorithm.

14. An apparatus for generating a decision tree for packet classification, comprising a network processor and a non-transitory memory storing programs, wherein the network processor is configured with a traffic classifier, and wherein the programs, when executed by the network processor cause the network processor to:
generate an encoded rule set according to a rule set, wherein: the rule set comprises multiple rules, each rule is a string that comprises 0, 1 or a wildcard, and the strings of any two rules are not the same; the encoded rule set comprises multiple encoded rules, and the strings of any two encoded rules are not the same; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment comprises at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment comprises at least two characters, if the number of wildcards in the first segment is greater than or equal to N, the first code segment is 1, and, if the number of wildcards in the first segment is less than N, the first code segment is 0, wherein N is an integer greater than or equal to 1 but less than or equal to M, M is the number of symbols in the first segment, and each wildcard represents a single character;

generate a first weighted undirected graph according to the encoded rule set generated, wherein: the first weighted undirected graph comprises multiple vertices, the multiple vertices are in one-to-one correspondence to the multiple encoded rules, and each of the multiple vertices corresponds to a rule subset; the rule subset corresponding to a first vertex comprises all rules, corresponding to the first encoded rule, in the multiple rules; the first vertex is any vertex in the first weighted undirected graph; and the first encoded rule is an encoded rule, corresponding to the first vertex, in the multiple encoded rules;

calculate a weight of each side in the first weighted undirected graph according to the first weighted undirected graph generated, wherein: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of is in a result of the bitwise operation, wherein the number of is in the result of the bitwise operation is a value of the second function;

if a weight of a side with a maximum weight in the first weighted undirected graph is greater than a first threshold, wherein the first threshold is an integer greater than or equal to 0 but less than or equal to X−1, and X is the number of bits in the first encoded rule, perform generation operations cyclically until a weight of a side with a maximum weight in a newly generated weighted undirected graph is less than or equal to the first threshold, and then send a trigger signal, wherein the generation operations comprise generating a new vertex according to the side with the maximum weight in the last generated weighted undirected graph among weighted undirected graphs that are generated, and generating a new weighted undirected graph according to the new vertex, wherein: the new weighted undirected graph comprises the new vertex and all vertices of the last generated weighted undirected graph except two vertices of the side with the maximum weight among the weighted undirected graphs that are generated; an encoded rule corresponding to the new vertex is a value of a third function that uses a fourth encoded rule and a fifth encoded rule as variables, wherein the fourth encoded rule and the fifth encoded rule correspond to the two vertices of the side with the maximum weight respectively in the last generated weighted undirected graph among the weighted undirected graphs that are generated; the third function is used to perform a bitwise AND operation for the fourth encoded rule and the fifth encoded rule, wherein a result of the bitwise AND operation is a value of the third function; a rule subset corresponding to the new vertex comprises all rules in rule subsets that correspond to the two vertices of the side with the maximum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of is in a result of the bitwise operation, wherein the number of is in the result of the bitwise operation is a value of the fourth function;

generate a decision tree for a rule subset corresponding to each vertex respectively in the newly generated weighted undirected graph according to the trigger signal;

store, in the non-transitory memory, the decision tree;

when a network device receives an internet protocol packet, match a rule of the stored decision tree with a field of the received internet protocol packet; and perform an action corresponding to the determined rule that matches the field of the internet protocol packet, the action corresponding to passing, discarding, traffic limiting, or bandwidth guaranteeing, the internet protocol packet.

15. The apparatus according to claim 14, wherein the decision tree for the rule subset is generated by using a Modular algorithm.

16. An apparatus for generating a decision tree for packet classification, comprising a network processor and a non-transitory memory storing programs, wherein the network processor is configured with a traffic classifier, and wherein when the programs are executed by the network processor, the programs cause the network processor to:

generate an encoded rule set according to a rule set, wherein: the rule set comprises multiple rules, each rule is a string that comprises 0, 1 or a wildcard, and the strings of any two rules are not the same; the encoded rule set comprises multiple encoded rules, and the strings of any two encoded rules are not the same; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment comprises at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; in a scenario where the first segment comprises at least two characters, if the number of wildcards in the first segment is greater than or equal to N, the first code segment is 1, and, if the number of wildcards in the first segment is less than N, the first code segment is 0, wherein N is an integer greater than or equal to 1 but less than or equal to M, M is the number of symbols in the first segment, and each wildcard represents a single character; and in a scenario where the first segment comprises at least two characters, if the number of wildcards in the first segment is greater than or equal to N, the first code segment is 0, and, if the number of wildcards in the first segment is less than N, the first code segment is 1, wherein N is an integer greater than or equal to 1 but less than or equal to M, M is the number of symbols in the first segment and each wildcard represents a single character;

generate a first weighted undirected graph according to the encoded rule set generated, wherein: the first weighted undirected graph comprises multiple vertices, the multiple vertices are in one-to-one correspondence to the multiple encoded rules, and each of the multiple vertices corresponds to a rule subset; the rule subset corresponding to a first vertex comprises all rules, corresponding to the first encoded rule, in the multiple rules; the first vertex is any vertex in the first weighted undirected graph; and the first encoded rule is an encoded rule, corresponding to the first vertex, in the multiple encoded rules;

calculate a weight of each side in the first weighted undirected graph according to the first weighted undirected graph generated, wherein: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of is in a result of the bitwise operation, wherein the number of is in the result of the bitwise operation is a value of the second function;

if a weight of a side with a minimum weight in the first weighted undirected graph is less than a first threshold, wherein the first threshold is an integer greater than or equal to 1 but less than or equal to X, and X is the number of bits in the first encoded rule, perform generation operations cyclically until a weight of a side with a minimum weight in a newly generated weighted undirected graph is greater than or equal to the first threshold, and then send a trigger signal, wherein the generation operations comprise generating a new vertex according to the side with the minimum weight in the last generated weighted undirected graph among weighted undirected graphs that are generated, and generating a new weighted undirected graph according to the new vertex, wherein: the new weighted undirected graph comprises the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, wherein the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, wherein a result of the bitwise AND operation is a value of the third function; a rule subset corresponding to the new vertex comprises all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of is in a result of the bitwise operation, wherein the number of is in the result of the bitwise operation is a value of the fourth function;

generate a decision tree for a rule subset corresponding to each vertex respectively in the newly generated weighted undirected graph according to the trigger signal; and store, in the non-transitory memory, the decision tree;

when a network device receives an internet protocol packet, match a rule of the stored decision tree with a field of the received internet protocol packet; and perform an action corresponding to the determined rule that matches the field of the internet protocol packet, the action corresponding to passing, discarding, traffic limiting, or bandwidth guaranteeing the internet protocol packet.

17. The apparatus according to claim 16, wherein the decision tree for the rule subset is generated by using a Modular algorithm.

18. An apparatus for generating a decision tree for packet classification, comprising a network processor and a non-transitory memory storing programs, wherein the network processor is configured with a traffic classifier, and wherein when the programs are executed by the network processor, the programs cause the network processor to:

generate an encoded rule set according to a rule set, wherein: the rule set comprises multiple rules, each rule is a string that comprises 0, 1 or a wildcard, and the strings of any two rules are not the same; the encoded rule set comprises multiple encoded rules, and the strings of any two encoded rules are not the same; each of the multiple encoded rules corresponds to at least one of the multiple rules, and each of the multiple rules corresponds to one of the multiple encoded rules; an encoded rule corresponding to a first rule is obtained by encoding the first rule according to a first function, the first rule is any one of the multiple rules, and the first function is used to replace multiple segments in the first rule with multiple code segments to obtain a first encoded rule; the first rule consists of the multiple segments, and each segment comprises at least one character; the first encoded rule consists of the multiple code segments, each code segment is a bit, the multiple segments are in one-to-one correspondence to the multiple code segments, and a position of a first segment in the first rule is consistent with a position of a first code segment in the first encoded rule; the first segment is any one of the multiple segments; the first code segment is a code segment, corresponding to the first segment, in the multiple code segments; the first rule is a variable of the first function; the first encoded rule is a value of the first function; the first function is further used to calculate the first code segment according to the first segment; and in a scenario where the first segment comprises at least two characters, if the number of wildcards in the first segment is greater than or equal to N, the first code segment is 1, and, if the number of wildcards in the first segment is less than N, the first code segment is 0, wherein N is an integer greater than or equal to 1 but less than or equal to M, M is the number of symbols in the first segment, and each wildcard represents a single character;

generate a first weighted undirected graph according to the encoded rule set generated, wherein: the first weighted undirected graph comprises multiple vertices, the multiple vertices are in one-to-one correspondence to the multiple encoded rules, and each of the multiple vertices corresponds to a rule subset; the rule subset corresponding to a first vertex comprises all rules, corresponding to the first encoded rule, in the multiple rules; the first vertex is any vertex in the first weighted undirected graph; and the first encoded rule is an encoded rule, corresponding to the first vertex, in the multiple encoded rules;

calculate a weight of each side in the first weighted undirected graph according to the first weighted undirected graph generated, wherein: a side that connects any two vertices in the first weighted undirected graph is a side of the first weighted undirected graph; a weight of a first side is a value of a second function that uses a second encoded rule and a third encoded rule as variables; two vertices of the first side correspond to the second encoded rule and the third encoded rule respectively; the first side is any side in the first weighted undirected graph; and the second function is used to perform a bitwise operation for the second encoded rule and the third encoded rule and calculate the number of is in a result of the bitwise operation, wherein the number of is in the result of the bitwise operation is a value of the second function;

if a weight of a side with a minimum weight in the first weighted undirected graph is less than a first threshold, wherein the first threshold is an integer greater than or equal to 1 but less than or equal to X, and X is the number of bits in the first encoded rule, perform generation operations cyclically until a weight of a side with a minimum weight in a newly generated weighted undirected graph is greater than or equal to the first threshold, and then send a trigger signal, wherein the generation operations comprise generating a new vertex according to the side with the minimum weight in the last generated weighted undirected graph among weighted undirected graphs that are generated, and generating a new weighted undirected graph according to the new vertex, wherein: the new weighted undirected graph comprises the new vertex and all vertices of the last generated weighted undirected graph except two vertices of the side with the minimum weight among the weighted undirected graphs that are generated; an encoded rule corresponding to the new vertex is a value of a third function that uses a fourth encoded rule and a fifth encoded rule as variables, wherein the fourth encoded rule and the fifth encoded rule correspond to the two vertices of the side with the minimum weight respectively in the last generated weighted undirected graph among the weighted undirected graphs that are generated; the third function is used to perform a bitwise AND operation for the fourth encoded rule and the fifth encoded rule, wherein a result of the bitwise AND operation is a value of the third function; a rule subset corresponding to the new vertex comprises all rules in rule subsets that correspond to the two vertices of the side with the minimum weight respectively in the last generated weighted undirected graph among the weighted undirected graphs that are generated; a weight of a second side in the new weighted undirected graph is a value of a fourth function that uses a sixth encoded rule and a seventh encoded rule as variables; two vertices of the second side correspond to the sixth encoded rule and the seventh encoded rule respectively; the second side is any side in the new weighted undirected graph; and the fourth function is used to perform a bitwise operation for the sixth encoded rule and the seventh encoded rule and calculate the number of is in a result of the bitwise operation, wherein the number of is in the result of the bitwise operation is a value of the fourth function;

generate a decision tree for a rule subset corresponding to each vertex respectively in the newly generated weighted undirected graph according to the trigger signal;

store, in a non-transitory memory of the apparatus, the decision tree;

when a network device receives an internet protocol packet, match a rule of the stored decision tree with a field of the received internet protocol packet; and perform an action corresponding to the determined rule that matches the field of the internet protocol packet, the action corresponding to passing, discarding, traffic limiting, or bandwidth guaranteeing, the internet protocol packet.

19. The apparatus according to claim 18, wherein the decision tree for the rule subset is generated by using a HyperCuts algorithm.

\* \* \* \* \*

UNITED STATES PATENT AND TRADEMARK OFFICE
CERTIFICATE OF CORRECTION

PATENT NO.        : 10,026,039 B2
APPLICATION NO.   : 14/497720
DATED             : July 17, 2018
INVENTOR(S)       : Jing Hu It is certified that error appears in the above-identified patent and that said Letters Patent is hereby corrected as shown below:

In the Claims

In Column 58, Line 67, Claim 1, delete "number of is" and insert --number of 1s--.
In Column 59, Line 1, Claim 1, delete "number of is" and insert --number of 1s--.
In Column 59, Line 47, Claim 1, delete "number of is" and insert --number of 1s--.
In Column 59, Line 48, Claim 1, delete "number of is" and insert --number of 1s--.
In Column 60, Line 12, Claim 4, delete "ft".
In Column 61, Line 3, Claim 5, delete "ft".
In Column 61, Line 21, Claim 5, delete "number of is" and insert --number of 1s--.
In Column 61, Line 22, Claim 5, delete "number of is" and insert --number of 1s--.
In Column 63, Line 33, Claim 9, delete "number of is" and insert --number of 1s--.
In Column 63, Line 34, Claim 9, delete "number of is" and insert --number of 1s--.
In Column 64, Lines 12-13, Claim 9, delete "number of is" and insert --number of 1s--.
In Column 64, Line 14, Claim 9, delete "number of is" and insert --number of 1s--.
In Column 65, Lines 56-57, Claim 14, delete "number of is" and insert --number of 1s--.
In Column 65, Line 58, Claim 14, delete "number of is" and insert --number of 1s--.
In Column 66, Line 37, Claim 14, delete "number of is" and insert --number of 1s--.
In Column 66, Line 38, Claim 14, delete "number of is" and insert --number of 1s--.
In Column 67, Lines 66-67, Claim 16, delete "number of is" and insert --number of 1s--.
In Column 68, Line 1, Claim 16, delete "number of is" and insert --number of 1s--.
In Column 68, Line 48, Claim 16, delete "number of is" and insert --number of 1s--.
In Column 68, Line 49, Claim 16, delete "number of is" and insert --number of 1s--.
In Column 70, Lines 1-2, Claim 18, delete "number of is" and insert --number of 1s--.
In Column 70, Line 3, Claim 18, delete "number of is" and insert --number of 1s--.
In Column 70, Line 50, Claim 18, delete "number of is" and insert --number of 1s--.
In Column 70, Line 51, Claim 18, delete "number of is" and insert --number of 1s--.

Signed and Sealed this
Thirtieth Day of October, 2018

Andrei Iancu
*Director of the United States Patent and Trademark Office*